(12) United States Patent
Karr

(10) Patent No.: US 7,646,330 B2
(45) Date of Patent: Jan. 12, 2010

(54) SYSTEM AND METHOD FOR LOCATING OBJECTS AND COMMUNICATING WITH THE SAME

(75) Inventor: Lawrence J. Karr, Santa Monica, CA (US)

(73) Assignee: Alfred E. Mann Foundation for Scientific Research, Santa Clarita, CA (US)

( * ) Notice: Subject to any disclaimer, the term of this patent is extended or adjusted under 35 U.S.C. 154(b) by 35 days.

(21) Appl. No.: 11/885,843

(22) PCT Filed: Dec. 20, 2005

(86) PCT No.: PCT/US2005/046333

§ 371 (c)(1),
(2), (4) Date: Sep. 6, 2007

(87) PCT Pub. No.: WO2006/098791

PCT Pub. Date: Sep. 21, 2006

(65) Prior Publication Data

US 2008/0165059 A1 Jul. 10, 2008

Related U.S. Application Data

(60) Provisional application No. 60/661,771, filed on Mar. 14, 2005, provisional application No. 60/730,592, filed on Oct. 26, 2005.

(51) Int. Cl.
*G01S 13/74* (2006.01)
*G01S 13/06* (2006.01)
*G01S 13/08* (2006.01)
*G01S 13/00* (2006.01)

(52) U.S. Cl. .............. 342/44; 342/42; 342/51; 342/175; 342/194; 342/195; 342/196; 342/450; 342/451; 342/458; 342/463; 342/464; 342/465; 340/825; 340/825.36; 340/7.2; 340/10.1; 340/10.5; 340/10.51; 340/10.52; 340/500; 340/531; 340/539.1; 340/539.11; 340/539.12; 340/539.13

(58) Field of Classification Search ............. 342/29–51, 342/118, 125, 145, 175, 192–197, 450–465; 340/901–904, 933–935, 568.1, 571, 7.2–7.46, 340/10.1–10.6, 500, 501, 514, 531, 539.1, 340/539.11, 539.15, 539.3, 988, 989, 993, 340/825, 825.36
See application file for complete search history.

(56) References Cited

U.S. PATENT DOCUMENTS 3,049,709 A 8/1962 Rianhard
(Continued)

*Primary Examiner*—Bernarr E Gregory
(74) *Attorney, Agent, or Firm*—Malcolm J. Romano

(57) ABSTRACT

Communication between a remote locator and a transponder is used to determine the relative position of the transponder. The transponder and locator each include a transmitter and a receiver. The locator transmits an inquiry in the form of a relatively powerful cyclically encoded signal with repetitive elements, uniquely associated with a target transponder. Periodically, each transponder correlates its coded ID against a possible inquiry signal, determining frequency, phase and framing in the process. Upon a match, the transponder transmits a synthesized response coherent with the received signal. The locator integrates multiple cyclical response elements, allowing low-power transmissions from the transponder. The locator correlates the integrated response, determines round-trip Doppler shift, time-of-flight, and then computes the distance and angle to the transponder. The transponder can be wearable, bionically implanted, or attached to, or embedded in, some object.

77 Claims, 17 Drawing Sheets

U.S. PATENT DOCUMENTS

| | | | |
|---|---|---|---|
| 3,568,161 A * | 3/1971 | Knickel | 340/993 |
| 3,646,580 A * | 2/1972 | Fuller et al. | 342/50 |
| 3,662,267 A * | 5/1972 | Reed | 340/993 |
| 3,714,650 A * | 1/1973 | Fuller et al. | 342/42 |
| 3,839,717 A * | 10/1974 | Paul | 342/44 |
| 4,611,198 A * | 9/1986 | Levinson et al. | 340/539.11 |
| 4,675,656 A * | 6/1987 | Narcisse | 340/539.15 |
| 4,797,948 A * | 1/1989 | Milliorn et al. | 340/10.52 |
| 4,862,176 A * | 8/1989 | Voles | 342/45 |
| 4,897,642 A * | 1/1990 | DiLullo et al. | 340/10.41 |
| 4,918,425 A * | 4/1990 | Greenberg et al. | 340/539.3 |
| 4,952,913 A * | 8/1990 | Pauley et al. | 340/514 |
| 5,126,733 A * | 6/1992 | Sagers et al. | 340/7.21 |
| 5,199,044 A * | 3/1993 | Takeuchi et al. | 342/458 |
| 5,278,563 A * | 1/1994 | Spiess | 342/44 |
| 5,396,218 A * | 3/1995 | Olah | 340/571 |
| 5,418,537 A | 5/1995 | Bird | |
| 5,493,286 A * | 2/1996 | Grube et al. | 340/7.25 |
| 5,576,716 A | 11/1996 | Sadler | |
| 5,959,568 A | 9/1999 | Woolley | |
| 6,054,936 A * | 4/2000 | Yamagata et al. | 340/903 |
| 6,141,293 A | 10/2000 | Amorai-Moriya | |
| 6,150,921 A | 11/2000 | Werb | |
| 6,243,025 B1 * | 6/2001 | Yamagata et al. | 340/903 |
| 6,317,049 B1 | 11/2001 | Toubia | |
| 7,253,717 B2 * | 8/2007 | Armstrong et al. | 340/10.2 |
| 2002/0063622 A1 * | 5/2002 | Armstrong et al. | 340/10.31 |
| 2002/0175805 A9 * | 11/2002 | Armstrong et al. | 340/10.31 |
| 2005/0228659 A1 | 10/2005 | Mitlin | |
| 2006/0038676 A1 | 2/2006 | Richards | |

\* cited by examiner

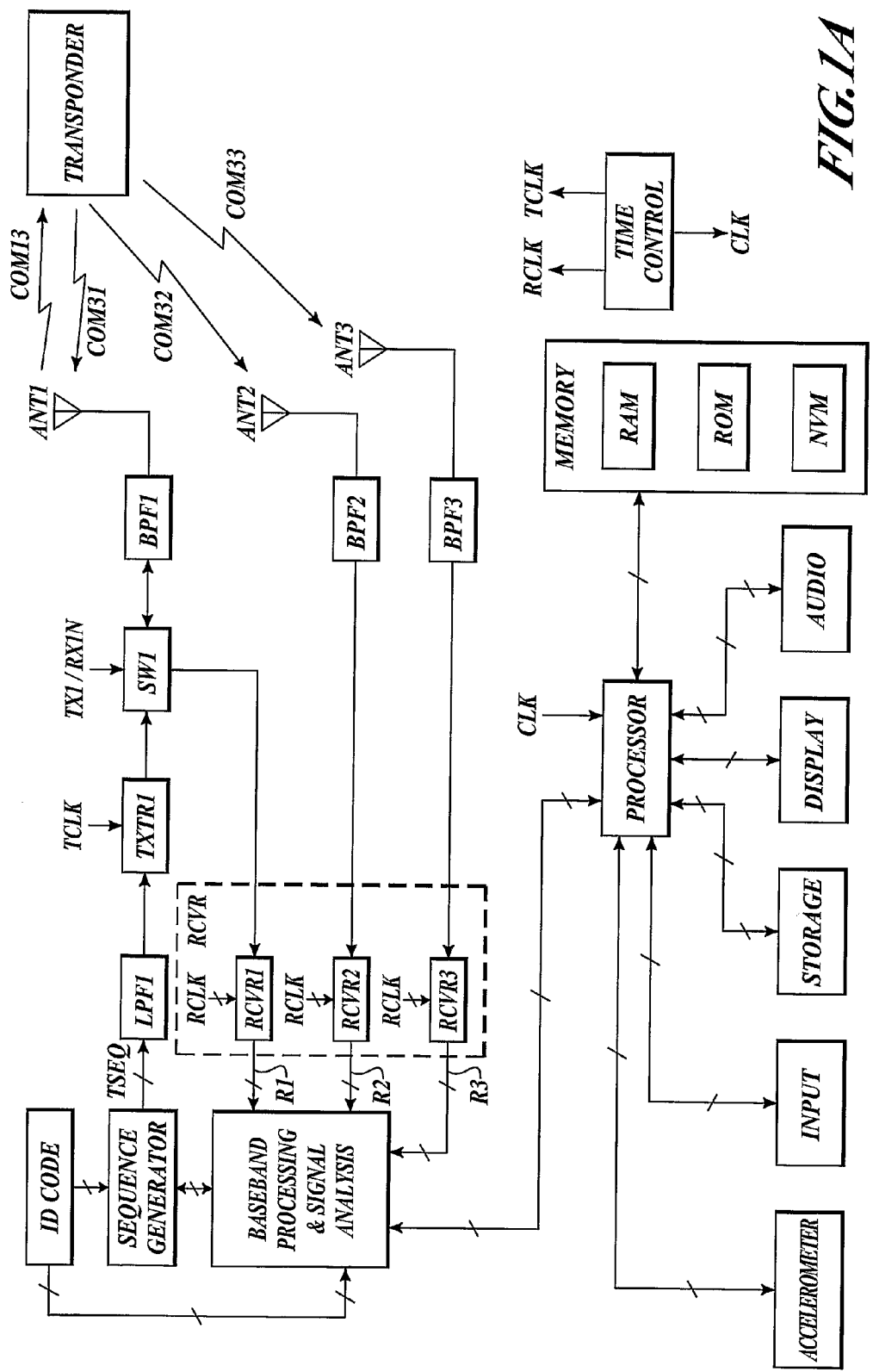

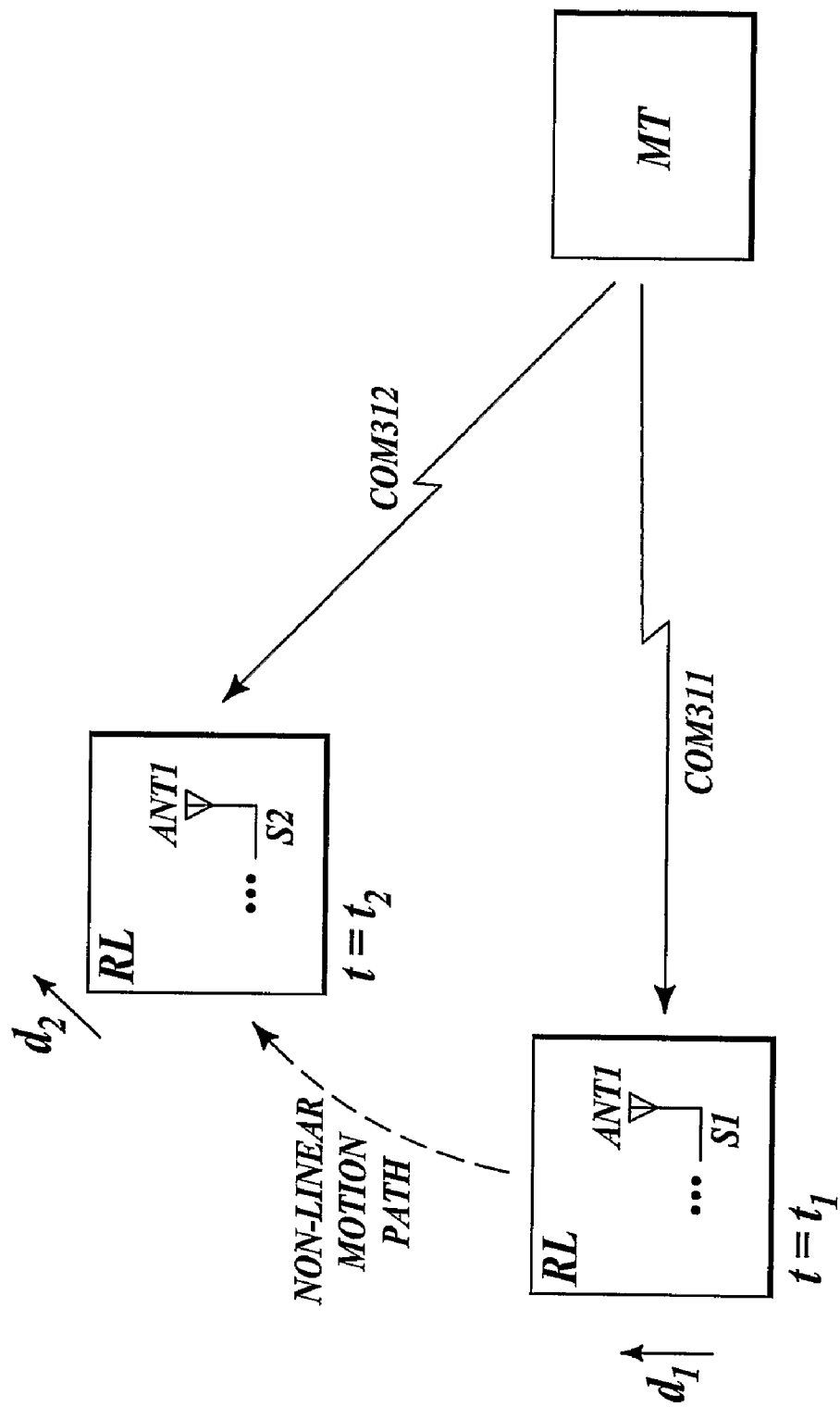

SYSTEM AND METHOD FOR LOCATING OBJECTS AND COMMUNICATING WITH THE SAME

FIELD OF THE INVENTION

The present disclosure relates generally to a system and method of locating an object. More particularly, the present disclosure relates to a system and method for locating a living being. The living being may be located with a bionic device that is implanted therein for the purposes of tracking location.

BACKGROUND OF THE INVENTION

Some methods for locating an object are known in the art. A missing vehicle locator system is described in U.S. Pat. No. 5,418,736 issued to Bird. The vehicle locator system uses one or more GPS systems in conjunction with a GPS antenna, a receiver/transmitter, a telephone with associated antennas, and a modem mounted in a vehicle whose position is to be monitored. A paging request is issued and received by a paging responder in the vehicle. The paging request causes the modem to interrogate the GPS receiver to determine the current position of the vehicle. The current position of the vehicle is transmitted via a cellular telephone link to notify a vehicle location service center of the current location of the vehicle. Other known location determination techniques include the use of a Loran or a Glonass satellite based system.

Another object location system is described in U.S. Pat. No. 5,576,716 to Sadler for locating lost or stolen property. This location system includes a GPS module, a microcomputer, a modem, and a telephone, all of which must be installed in the vehicle. The system described regularly and automatically computes the position of the property for transmission via the phone link to a central receiver/transmission station.

Low power transmissions are subject to signal corruption due to noise, static, and signal interference. Extracting information from a signal in the presence of such interference and noise is very difficult when the information signal is of the same order of magnitude as the noise sources. The presently described invention identifies various noise problems from the conventional solutions and provides a new and novel system, method, and apparatus that is arranged to extract signals from a transmission using very low power in a small scale object location system.

SUMMARY OF THE INVENTION

This summary of the invention section is intended to introduce the reader to aspects of the invention and is not a complete description of the invention. Particular aspects of the invention are pointed out in other sections herein below and the invention is set forth in the appended claims, which alone demarcate its scope.

The present disclosure is related to a system and method of locating an object. More particularly, the present disclosure relates to a system, apparatus and method for locating a living being. A remote locator (RL) is arranged to communicate with a transponder or micro-transponder (MT) for determining the location of the MT. The transponder device may be a wearable device, bionically implanted in a living being, attached to an object, or embedded in some object.

Briefly stated, communication between a RL and a MT is used to determine the relative position of the MT. The RL and the MT each include a transmitter and a receiver. An asymmetric cooperative protocol is used, where the MT's response to a RL's inquiry is coherent with respect to the received locator signal. The RL emits a relatively powerful signal with a repeating sequence. Periodically, the MT correlates an internal ID code against incoming signals and/or noise. Upon a match, the MT emits a synthesized response coherent with the received signal. The RL cyclically integrates multiple response sequences received from the MT, allowing low transmission power in the MT. The RL correlates the integrated response, determines round-trip Doppler and time-of-flight, and computes the distance and angle to the MT. The MT can be a wearable device, bionically implanted, attached to an object, or embedded in some object.

The RL may be arranged to initiate a transmission sequence that includes transmission signals that are encoded with a unique identifier that is associated with the MT. The coded transmission is broken into frames that include sufficient information to identify clock and timing recovery simultaneous with transfer of information and validation signals. The MT can be arranged to operate in a sleep mode to conserve power. Periodically, the MT is activated out of the sleep mode to capture signals that can be noise and/or signals from the RL's transmissions. A variety of signal processing functions are performed on the captured signals to validate that the transmission is received by the intended MT. Frequency and phase information is initially recovered from one portion of the transmission, and further refined using a bootstrapping process. Timing location within the frame (e.g., coarse timing) is recovered in another portion of the transmission. After the timing, phase and frequency are recovered, data reception is scheduled with a degree of certainty. The data is extracted and a reply message is transmitted from the MT back to the RL, where similar signal processing functions are performed. The carefully corrected round-trip time of the transmission sequence is used to identify distance between the RL and the MT. A round-trip Doppler shift, that is independent of the MT clock, is measured to and correlated against the relative motion of the RL and MT to assess the directional vector from the RL to the MT.

The RL includes one, two, or more antennas that arranged to resolve the direction ambiguity associated with the evaluated Doppler shift. In one example, two antennas are physically spaced apart from one another and the arrival time for reception between the two antennas is identified. A measured acceleration vector such as from an accelerometer in the RL is used with the arrival times to resolve the directional ambiguity. In another example, three antennas are included in the RL and the receive times associated with the three antennas are used to resolve the directional ambiguity. For the example where two antennas are used, the antennas are spaced apart along an axis that is perpendicular to the direction of travel for the RL such that the first antenna that receives an identifiable signal resolves which side of the RL the MT is located relative to the direction of travel (e.g., on the right side of the RL or the left side of the RL).

The presently described system has the ability to identify location of a MT with a RL utilizing an asymmetric transmission system. The signals captured by the MT will typically not be aligned in time with the start and end of a complete pattern in the sequence (e.g., a 2047 chip sequence). However, the RL is arranged to transmit repeated patterns over time in the sequence. The MT is arranged to captures signals over a sufficient length of time to capture a complete pattern in the sequence, even though the captured pattern may be rotated in time relative to the start and end of a complete pattern. A circular correlator can be used to evaluate the captured signals such that the captured signals are properly identified with the specific MT, despite the rotation status of the pattern. Since the MT may not have a priori knowledge of the timing related to transmission and reception from the RL, the circular correlations of the received transmissions are also used by the MT to determine the fine and coarse timing. A circular correlation is a correlator that operates on a sequence of fixed length, where the sequence may be circularly shifted in time such that the beginning of the original sequence may be received in the shifted sequence after the end of the original sequence. While a general correlator may not give valid timing information, the circular correlation will provide valid timing information when the captured signals are not aligned in time with the start and end of a complete pattern.

The signals captured by the MT will typically not comprise a neat period of the sequence (e.g., a 2047 chip sequence). Since the MT does not have a priori knowledge of the timing related to transmission and reception from the RL, circular correlations of the received transmissions are used by the MT to determine the fine and coarse timing. While a general correlator may not give valid timing information, the circular correlation will provide valid timing information when the captured signals are not in a neat period.

The presently described asymmetric transmission system can be configured such that the MT receives a relatively high power transmission of a structured signal from the RL, while the reply or acknowledgement transmission from the MT to the RL is a very low power transmission. An example MT is configured to operate in a very low power "inactive" mode or "sleep mode", where the MT "activates" or "wake-ups" for brief intervals to listen for the transmission from the RL. The MT correlates each piece of its received structured signals to determine if these signals are coded with an identification code (ID Code) that is specifically associated with the MT. The MT also determines the precise frequency, timing, phase, and cadence for which a reply transmission can be transmitted back to the RL from the received structured signals. The reply transmission that is transmitted from the MT to the RL is a very low power transmission of short duration (a short structured signal) such that significant battery life is conserved. Although the reply transmission is a very low power transmission, the MT is arranged to utilize an integration and circular correlation technique to increase the signal-to-noise level of the captured reply transmission.

In the presently described system, a reply transmission signal is transmitted back to the RL from an MT, where the MT synthesizes timing, frequency, phase, and cadence for the reply transmission from signals that are received by the MT from the RL. The frequency of the reply transmission from the MT differs from the original frequency from the RL's transmission by a Doppler shift (ignoring other noise and minor error sources). As such, the RL can predict the reply transmission frequency with a very small margin of error. The potential uncertainty of the reply transmission frequency is small enough so that the phase rotation over several tens of transmission sequences is much less than one turn (one phase rotation through 360 degrees). This allows the RL to sample the reply transmission and add (or integrate), either in the analog domain or the digital domain, the respective samples from reply transmission sequence. Since noise sums as a square root and signal sums linearly, the signal-to-noise ratio for the captured signal is increased, allowing reception of a much lower level signal than would otherwise be the case without the use of exhaustive computation.

A more complete appreciation of the present invention and its improvements can be obtained by reference to the accompanying drawings, which are briefly summarized below, to the following detailed description of illustrative embodiments of the invention, and to the appended claims.

BRIEF DESCRIPTION OF THE DRAWINGS

FIGS. 1A and 1B illustrate an example communication system that includes a remote locator (RL) and a micro-transponder (MT);

FIGS. 1C, 1D and 1E illustrate various example mechanisms to resolve directional ambiguities between a RL and a MT;

DETAILED DESCRIPTION OF THE PREFERRED EMBODIMENT

Figure 1B:
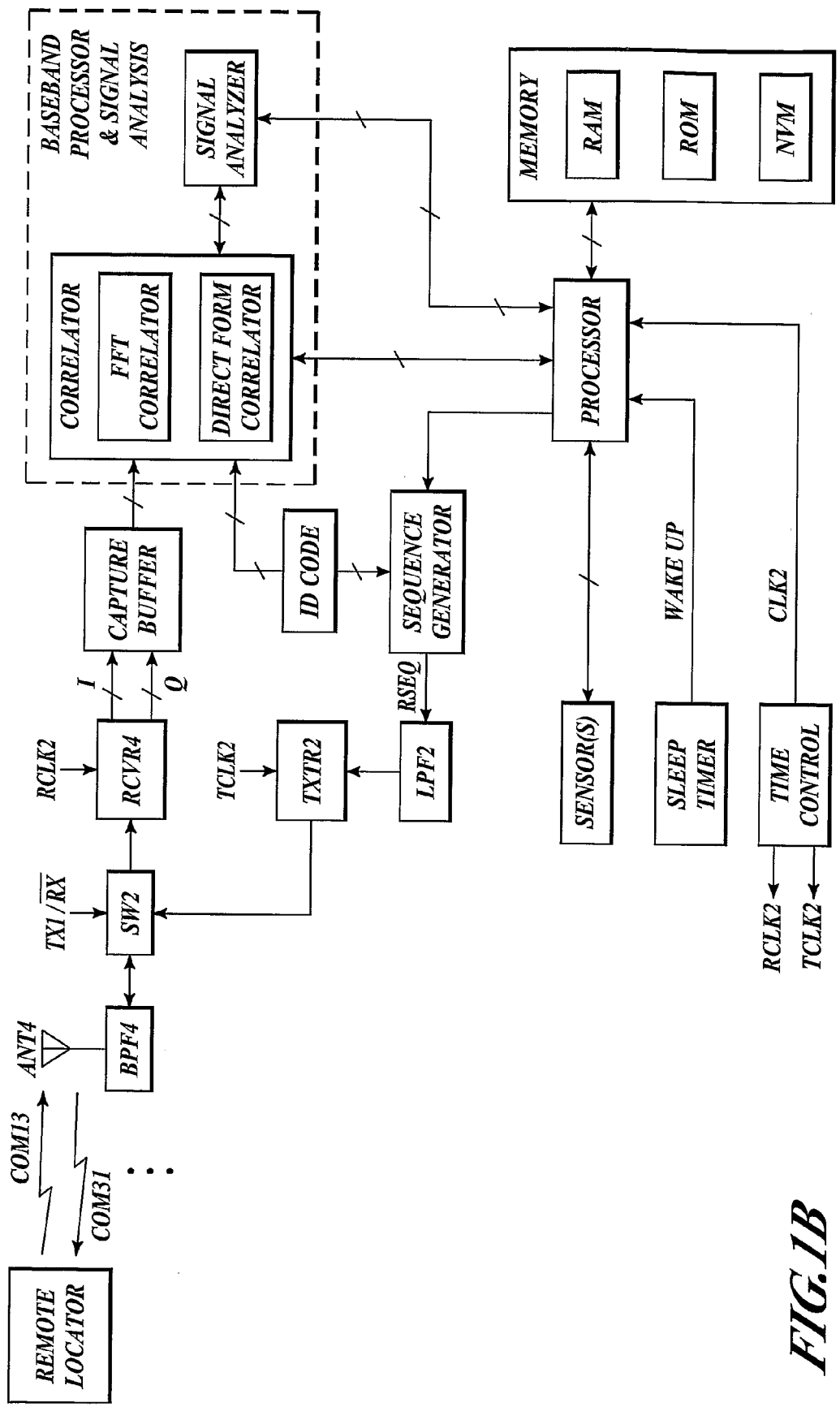

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal, electromagnetic wave signal, or data signal. The meaning of "a", "an", and "the" include plural references. The meaning of "in" includes "in" and "on".

Briefly stated, the present disclosure is related to an apparatus, system, and method for communicating between a remote locator (RL) and a micro-transponder (MT). Communication between a RL and a MT is used to determine a location of the MT. The MT and the RL each include a receiver and a transmitter. The communication signals from the transmitters are encoded with a unique ID code. The communication signal consists of a sequence of encoded transmissions, where each sequence is arranged to provide a portion of clock synchronization and calibration information. Each receiver validates the ID code for the transmission, and decodes information. The frequency, phase, and starting time of the coded transmission sequence is determined by the transmission sequence itself such that clock recovery can be performed without additional information. The MT can be a wearable circuit such as a watch, affixed to an object, embedded in an object, or an implantable bionic device.

Frequency and phase information in the MT is initially recovered from one portion of the transmission from the RL, and further refined using a bootstrapping process. Timing location within the frame (e.g., coarse timing) is recovered in another portion of the transmission from the RL. After the timing, phase and frequency are recovered, data reception can be scheduled with a degree of certainty. The data is extracted and a reply message is transmitted from the MT back to the RL, where similar signal processing functions are performed. The carefully corrected round-trip time of the transmission sequence is used to identify distance between the RL and the MT. A synthetic round-trip Doppler shift, which is independent of the MT's internal clock, is measured to and correlated against the relative motion of the RL and MT to assess the magnitude of a directional vector between the RL to the MT.

The RL includes one, two, or more antennas that arranged to resolve the direction ambiguity associated with the evaluated Doppler shift. In one example, two antennas are physically spaced apart from one another and the arrival time for reception between the two antennas is identified. A measured acceleration vector such as from an accelerometer in the RL is used along with the identified arrival times to resolve the directional ambiguity. In another example, the three antennas are included in the RL and the receive times associated with the three antennas are used to resolve the directional ambiguity.

The presently described system has the ability to identify location of a MT with a RL utilizing an asymmetric transmission system. The signals captured by the MT will typically not be aligned in time with the start and end of a complete pattern in the sequence (e.g., a 2047 chip sequence). However, the RL is arranged to transmit repeated patterns over time in the sequence. The MT is arranged to captures signals over a sufficient length of time to capture a complete pattern in the sequence, even though the captured pattern may not be rotated in time relative to the start and end of a complete pattern. A circular correlator can be used to evaluate the captured signals such that the captured signals are properly identified by the MT, despite the rotation status of the pattern. Since the MT does not have a priori knowledge of the timing related to transmission and reception from the RL, circular correlations of the received transmissions are used by the MT to determine the fine and coarse timing. A circular correlation is a correlator that operates on a sequence of fixed length, where the sequence may be circularly shifted in time such that the beginning of the original sequence may be received in the shifted sequence after the end of the original sequence. While a general correlator may not give valid timing information, the circular correlation will provide valid timing information when the captured signals are not aligned in time with the start and end of a complete pattern.

The presently described asymmetric transmission system can be configured such that the MT receives a relatively high power transmission of a structured signal from the RL, while the reply or acknowledgement transmission from the MT to the RL is a very low power transmission. An example MT is configured to operate in a very low power "inactive" mode or "sleep mode", where the MT "activates" or "wake-ups" for brief intervals to listen for the transmission from the RL. The MT correlates each piece of its received structured signals to determine if these signals are coded with an identification code (ID Code) that is specifically associated with the MT. The MT also determines the precise frequency, timing, phase, and cadence for which a reply transmission can be transmitted back to the RL from the received structured signals. The reply transmission that is transmitted from the MT to the RL is a very low power transmission of short duration (a short structured signal) such that significant battery life is conserved. Although the reply transmission is a very low power transmission, the MT is arranged to utilize an integration and circular correlation technique to increase the signal-to-noise level of the captured reply transmission.

In the presently described system, a reply transmission signal is transmitted back to the RL from an MT, where the MT synthesizes timing, frequency, phase, and cadence for the reply transmission from signals that are received by the MT from the RL. The frequency of the reply transmission from the MT differs from the original frequency from the RL's transmission by a Doppler shift (ignoring other noise and minor error sources). As such, the RL can predict the reply transmission frequency with a very small margin of error. The potential uncertainty of the reply transmission frequency is small enough so that the phase rotation over several tens of transmission sequences is much less than one turn (one phase rotation through 360 degrees). This allows the RL to sample the reply transmission and add (or integrate), either in the analog domain or the digital domain, the respective samples from reply transmission sequence. Since noise sums as a square root and signal sums linearly, the signal-to-noise ratio for the captured signal is increased, allowing reception of a much lower level signal than would otherwise be the case without the use of exhaustive computation.

Example System

FIGS. 1A and 1B illustrate an example communication system that includes a RL and a MT arranged in according with at least one aspect of the present disclosure. The RL is arranged to transmit a sequence over a first communication channel (COM13), while the MT is arranged to transmit back to the RL via two communication channels (COM31 and COM32).

The example RL device includes a first antenna (ANT1) that is coupled to a first transmit/receive switch (SW1). The first transmit/receive switch (SW1) is coupled to a first transmitter (TXTR1) and a first receiver (RCVR1) in response to a first control signal (TX1/RX1N). A transmission sequence (TSEQ) is coupled to the first transmitter (TXTR1) when transmission commences, where the sequence is determined by an ID code. A second receiver (RCVR2) is coupled to a second antenna (ANT2). The first and second receivers (RCVR1, RCVR2) are coupled to the baseband processing and signal analysis block. A third antenna (ANT3) may also be coupled to a third receiver (RCVR3), which is also coupled to the baseband processing and signal analysis block. Time control is provided to the transmitter, receiver, and a processor in the form of various control signals (TOSC, ROSC and CLK). The processor receives inputs and coordinates the operation of the baseband processing, signal analysis, memory buffering, input processing, display processing, and audio processing. The memory processing can include random access memory (RAM), read-only memory (ROM, as well as non-volatile memory (NVM) such as Flash memory, battery backed up RAM, EEPROM, as well as other NVM type technologies. The example MT device includes a fourth antenna (ANT4) that is coupled to a second transmit/receive switch (SW2). The second transmit/receive switch (SW2) is coupled to a second transmitter (TXTR2) and a fourth receiver (RCVR4) in response to another control signal (TX2/RX2N). A reply sequence (RSEQ) is coupled to the second transmitter (TXTR2) when transmission commences, where the sequence is determined by the ID code. The fourth receiver (RCVR4) is arranged to provide in-phase and quadrature signals (I and Q) to a capture buffer. The capture buffer is coupled to a correlator that can provide both direct form correlation and FFT correlation. The FFT correlator is arranged to provide a circular correlation function of the received I/Q data with the complex I/Q data related to the ID code. A signal analyzer and a processor are both arranged to receive the data output from the correlator for evaluation. Time control is provided to the transmitter, receiver, and the processor in the form of various additional control signals (TCLK, RCLK and CLK). The processor receives inputs and coordinates the operation of the correlator, signal analysis, memory buffering, input processing, display processing, and audio processing. The memory processing can include random access memory (RAM), read-only memory (ROM, as well as non-volatile memory (NVM) such as Flash memory, battery backed up RAM, EEPROM, as well as other NVM type technologies.

Current technology systems for locating people and things have a rather short battery life, which can limit their use. The present disclosure describes a small device (e.g, a transponder or a micro-transponder) that has a long battery life by suspending energy consumption until operation is required. Since the MT device needs to be in an active state for very brief intervals, the battery life is extended substantially. Although cellular telephone technologies can be used to determine position in conjunction with a global positioning system (GPS) set, the energy required to operate conventional cellular telephones even in a standby mode will rapidly deplete small batteries. In addition, a GPS set in such an application would awaken from sleep, and perform a cold start location fix, which process will consume a considerable amount of energy that again rapidly depletes the battery. The present disclosure contemplates that a portable location technology is preferably operated intermittently to minimize power consumption, and thus addresses some of the problems from conventional location determination techniques.

The present disclosure has analyzed and identified problems with current Doppler shift technology such as found in GPS signals. Although GPS signals may be detected efficiently by means of FFT correlation, there are approximately 28 GPS satellites that include a significant level of Doppler ambiguity from about ±15 ppm. For a GPS signal of 1.5 GHz and a capture interval of 1 msec, a Doppler shift of roughly 22 KHz maximum requires on the order of several tens of Doppler bins or correlation attempts to identify the Doppler shift. The processing efforts necessary to utilize a conventional GPS technology are unacceptable for the presently disclosed use. For example, the MT in the current disclosure is searching for a single code, and in addition, need not contend with huge velocities, and thus does not require any Doppler bins. Moreover, the present disclosure describes an apparatus and system that has reduced capture times relative to conventional technologies, where the magnitude of the processing is reduced by approximately two orders of magnitude.

Example Remote Locator (RL)

FIG. 1A illustrates an example RL that is arranged to communicate with an example MT. The MT is arranged (e.g., by a sleep timer) to wake up at pre-determined intervals and receive a coded transmission signal (e.g., COM13). The coded signals received and evaluated using a variety of signal processing methods such as digital signal processing, analog signal processing, Fast Fourier Transform (FFT), correlation, inverse FFT (IFFT) to name a few. The MT evaluates the received coded signals to determine if the signals are specifically identified with the MT (e.g., by a unique ID code). Through the various signal-processing functions, various internal signals and parameters are varied such that time, frequency and phase alignments for receiving and transmitting coded information are successively refined (e.g., through digital control mechanisms) for accurate processing. The MT, using as it's time base the Doppler shifted frequency of the signal from the RL, subsequently transmits a reply sequence back to the RL, which is similarly coded. The RL receives the coded transmission, and processes the incoming signals in a similar fashion as the MT. The antennas in the RL (e.g., ANT1, ANT2) are physically separated from one another such that, with the measured Doppler shift, it is possible to determine which antenna is physically closer to the MT, resolving the angle ambiguity, and (e.g., via signal analysis and processing) to determine a location vector between the RL and the MT.

The RL includes a processor that can be any appropriate processing means including but not limited to at least one: micro-processor, micro-controller, CISC processor, RISC processor, application specific integrated circuit (ASIC), to name a few. The processor is arranged to: receive and evaluate inputs, control outputs, log data, retrieve logged data, and execute programs. The processor is thus arranged to communicate with any number of circuit components such as: a time control circuit, an input circuit, a display circuit, an audio circuit, a storage circuit, and a memory circuit. Example inputs can be from any number of sources such as: an interrupt signal, a wake-up timer, a keyboard device, a touch-screen (passive or active), a touch-panel, a joystick device, a mouse device, a touch-pad device, another processor and an input generated by a software program. Voice recognition under software control can be used in conjunction with the audio circuit to generate an input. The display and audio circuits can be used as an indication means for reporting information to a user of the RL device, as well as to display navigation and location information. The storage circuit can be any known storage mechanism such as a magnetic recording device (e.g., a disk drive, a hard disk drive, a tape drive), an optical recording device (e.g., CD, DVD, etc.), to name a few. The memory circuit can include a dynamic-type memory (DRAM), a static-type memory (SRAM), a read-only-type memory (ROM), and a non-volatile-type memory (NVM), to name a few.

The RL is operated to send a transmission that consists of a series of coded signals. The code is generated by a unique identifier (e.g., an ID Code) that is associated with a specific MT. A sequence generator is arranged to evaluate the unique identifier and create a transmit sequence. After the coded sequence is generated for the unique identifier, additional information is encoded into the transmit sequence. In one example, the additional information can be command/control instructions for the MT. Only one sequence need be transmitted to accomplish communication, timing synchronization, and sequence validation. The output of the sequence generator (e.g., TSEQ) can be filtered such as by a low pass filter (LPF1) prior to coupling the signal to the transmitter.

The transmitter (TXTR1) is arranged to carrier modulate (e.g., multi-phase shift keying, binary phase shift keying, quadrature phase shift keying, differential phase shift keying, continuous phase modulation, multiple amplitude and phase shift keying, etc.) the coded signals with a carrier frequency, a spread spectrum carrier, and/or a frequency hopping method. The transmit-receive switch (SW1) is arranged to couple the carrier modulated coded signals to the antenna (ANT1) during the transmit sequence. A band-limiting filter (e.g., BPF1) can be provided between the antenna and the transmit-receive switch (SW1) such that out-of-band signals are ignored. The band-limiting filter (BPF1) can be any filter that provides reasonable band-limiting functions such as: a passive band-pass filter, an active band-pass filter, a surface acoustic wave (SAW) filter, a bulk acoustic wave (BAW) filter, a comb filter, a strip-line filter, to name a few.

The RL is operated to receive a transmission from the MT that consists of another series of coded signals. The coded signal is similarly generated by the MT with a unique identifier (e.g., the ID Code) that is associated with the specific MT. The receiver (e.g., RCVR1) is arranged to receive carrier modulated (e.g., multi-phase shift keying, binary phase shift keying, quadrature phase shift keying, differential phase shift keying, continuous phase modulation, multiple amplitude and phase shift keying, etc.) coded signals from the antenna (ANT1) via SW1. Another receiver (e.g., RCVR2) may be arranged to receive the carrier modulated coded signals from another antenna (ANT2). Optionally, the two antennas (ANT1, ANT2) can be multiplexed to a common receiver circuit. The received signals are handled by a baseband processor that can also provide signal-processing functions. Alternatively, the baseband processor is arranged to provide captured signals to the processor, which is arranged to handle signal-processing functions. For the case where the two antennas are used with two separate receiver sections, another band-limiting filter (e.g., BPF2) may be employed between the antenna and the receiver as previously described.

The described RL performs distance measurement by round trip time measurement. For example, the round trip time can be determined by the difference in time between the transmission of a signal from the MT to the RL, and the subsequent reply transmission of an acknowledgement signal from the RL back to the MT, offset by any other delays. Bearing to the MT is determined by measuring the velocity or acceleration of the RL, determining the synthetic round-trip Doppler or synthetic differential round-trip Doppler information (e.g., Doppler shift or Doppler acceleration), and providing a signed velocity with the measured velocity or acceleration of the RL. Differential Doppler information is relatively insensitive to target motion but not target acceleration. The RL's acceleration vector can be measured with a three-axis accelerometer, or with a GPS set when available with a clear view of the sky.

The position fixes on the MT may have a two-fold ambiguity in location, since for linear motion two angle estimates exist. The location ambiguity can be resolved by non-linear motion (e.g., changing a direction of travel) of the RL relative to the MT, using a single one of the antennae from FIG. 1A. An example of a RL that includes one antenna employing non-linear motion is illustrated in FIG. 1C. As illustrated in FIG. 1C, an antenna (ANT1) in the RL receives a first signal ($S_1$) from a first communication signal (COM311) at a first time ($t_1$) when the RL is moving in a first direction ($d_1$). The antenna (ANT1) in the RL receives a second signal ($S_2$) from a second communication signal (COM312) at a second time ($t_2$) when the RL is moving in a second direction ($d_2$) that is different from the first direction ($d_1$). The RL is thus moving along a non-linear motion path between times $t_1$ and $t_2$.

Figure 1D:
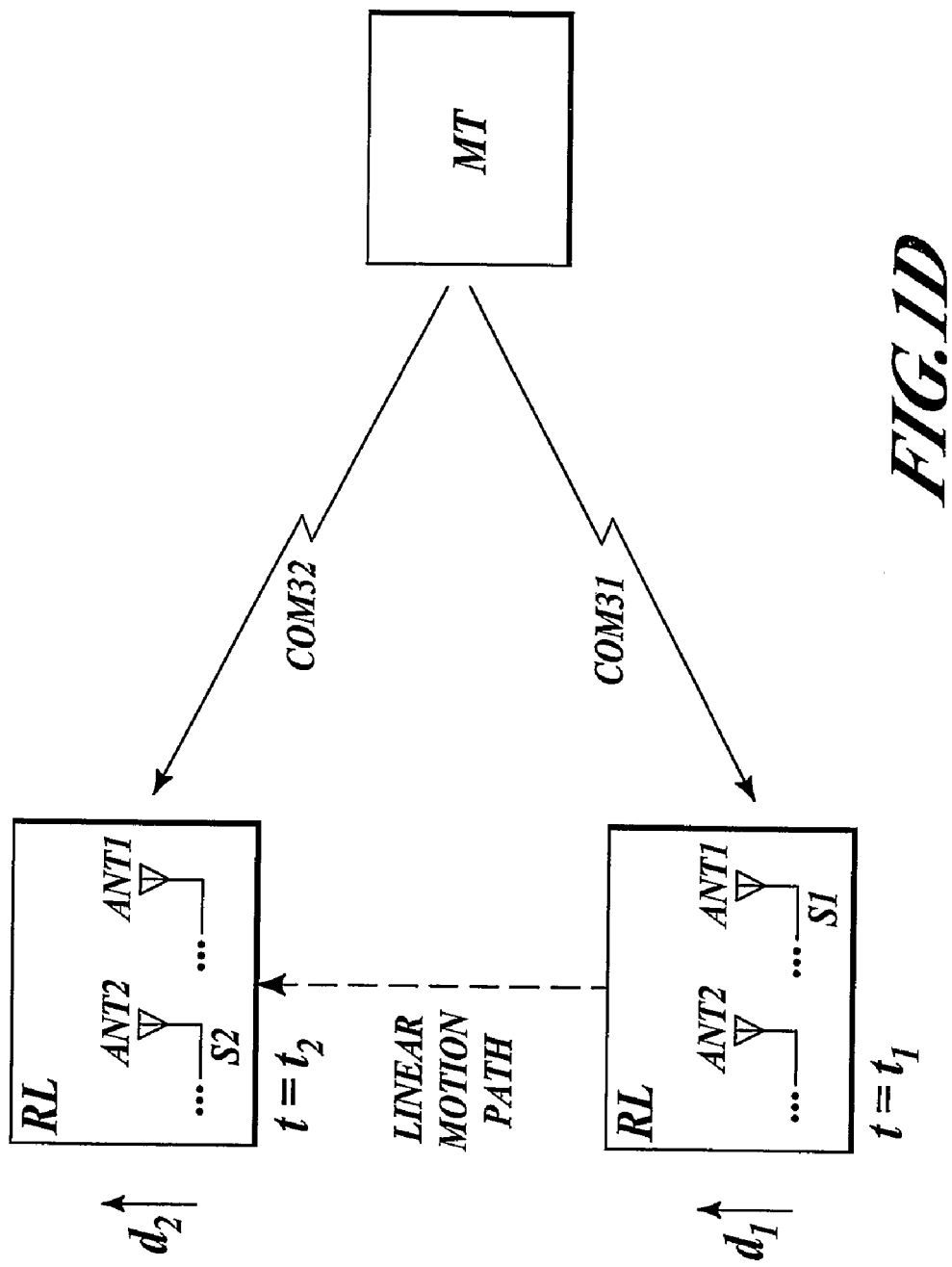

A two antenna system requires that at least one of the RL and the MT are moving relative to one another such that it is possible to detect a direction. An example of an RL that employs a two antenna system for resolving direction is illustrated in FIG. 1D. As illustrated in FIG. 1D, a first antenna (ANT1) in the RL receives a first signal ($S_1$) from a first communication signal (COM31) at a first time ($t_1$) when the RL is moving in a first direction ($d_1$). A second antenna (ANT2) in the RL receives a second signal ($S_2$) from a second communication signal (COM32) at a second time ($t_2$) when the RL has moved positions along either the same first direction ($d_1$) along a linear motion path, or in another direction (not shown) that is along a non-linear motion path. The antennas are spaced apart along an axis that is perpendicular to the direction of travel for the RL such that the first antenna that receives an identifiable signal resolves which side of the RL the MT is located relative to the direction of travel (e.g., on the right side of the RL or the left side of the RL). The received signal time of one antenna is slightly different from that of the other antenna. Since the closer antenna will have earlier information than the antenna that is further away, such that the location ambiguity can be resolved based on the relative arrival times and the direction of travel of the RL.

In another example, a third antenna that is physically spaced apart from the first and second antennas can be used to resolve the direction ambiguity. The third antenna has the added benefit that the location ambiguity can be resolved without any movement required by the RL. In one example, the third antenna (ANT3) is arranged to cooperate with a third receiver (RCVR3) through a third band-limiting filter (e.g., BPF3) as illustrated in FIG. 1A. However, the third antenna may be multiplexed with a single receiver similar to that previously described in the two antenna system described above.

Figure 1E:
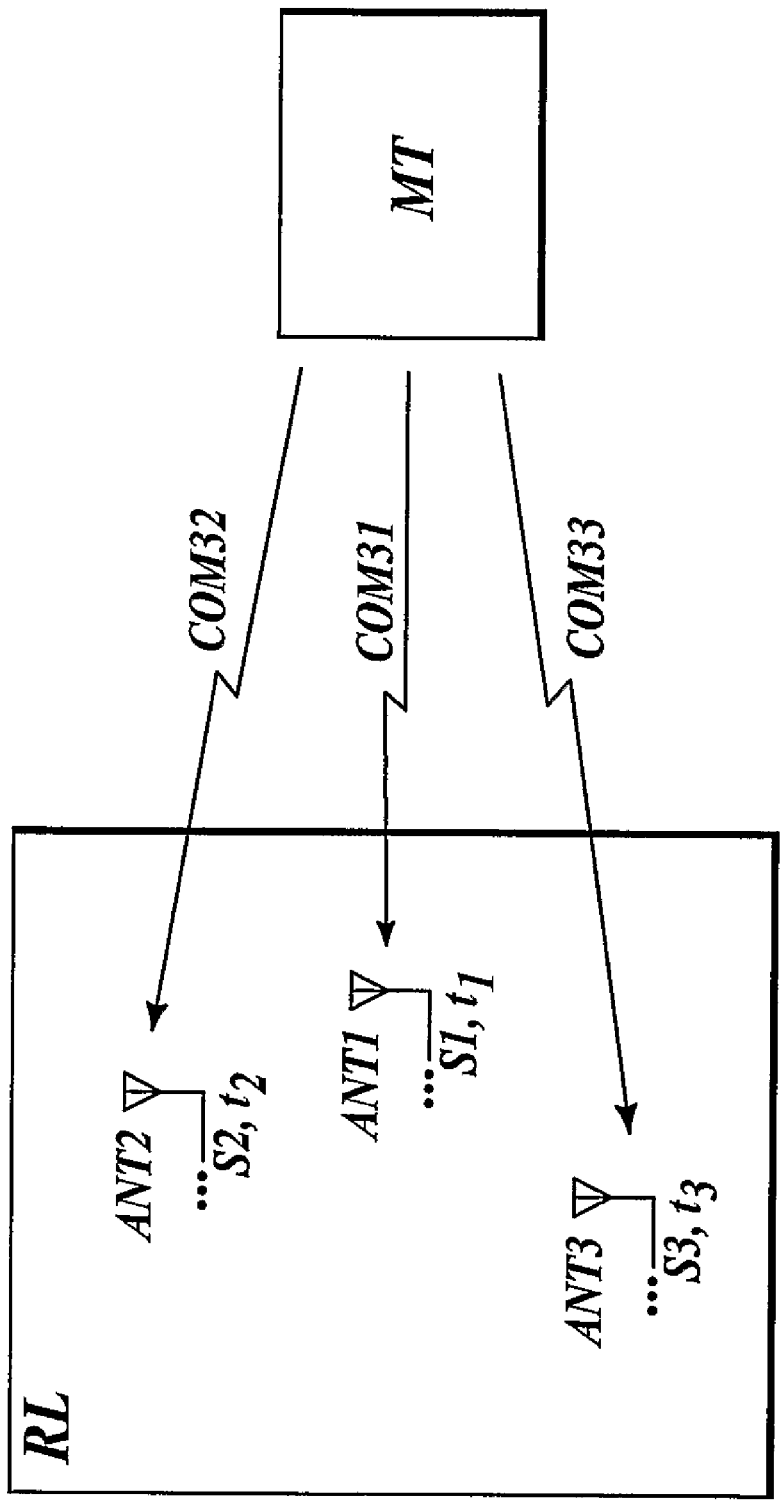

An example of an RL that employs a three antenna system for resolving direction is illustrated in FIG. 1E. As illustrated in FIG. 1E, a first antenna (ANT1) in the RL receives a first signal ($S_1$) from a first communication signal (COM31) at a first time ($t_1$). A second antenna (ANT2) in the RL receives a second signal ($S_2$) from a second communication signal (COM32) at a second time ($t_2$). A third antenna (ANT3) in the RL receives a third signal ($S_3$) from a third communication signal (COM33) at a third time ($t_3$). The received signal times of each antenna are slightly different from one another. By analyzing the arrival times of each antenna relative to one another, a directional vector can be determined since closer antennas will have earlier information than antennas that are further away.

Various timing signals that are employed by the RL are generated by a time control circuit as illustrated in FIG. 1A. The processor is operated from a first clock signal (CLK), while the transmitter and receiver(s) are operated by a second clock signal (TCLK) and third clock signal (RCLK), respectively. The timing signals are used by the system to digitally synthesize transmitter and receiver carrier wave signals from a locally generated oscillator signal in the RL.

Example Micro-Transponder (MT)

FIG. 1B illustrates an example MT that is arranged to communicate with a RL. The example MT may be placed in a wristband, a watch, sewn into an article of clothing, or implanted in a patient such as a with a bionic-type device. The MT is arranged to receive a coded transmission signal, such as previously described, from the RL with receiver RCVR4 via switch SW2 and antenna ANT4. Optionally, a band-limiting filter (e.g., BPF4) can be used to minimize interference from out-of-band signals in the receiver. The receiver demodulates the carrier frequency with oscillator signal ROSC2 and provides I and Q information, which is subsequently captured by a capture buffer. The capture buffer provides output signals in the form of data to an FFT correlator, which correlates the decoded transmission with the unique identifier (ID code). The processor is arranged to cooperate with memory similar to that previously described for the RL.

Various processing methods are employed to perform base-band processing and signal analysis in the MT, including a correlator block and a signal analyzer block. The correlator block may include an FFT correlator and a direct-form correlator. The signal analyzer is arranged to evaluate the outputs from the FFT correlator and/or the direct form correlator, to determine if the received transmission sequence is identified with the specific MT. When the sequence is appropriately identified, various timing signals are adjusted such that the frequency and phase of the digitally synthesized transmitter and receiver signal(s) are precisely aligned in the MT. Information from the coded signals is extracted by the processor once the transmission sequence is validated. Such information can include command and control instructions for the MT such as, for example, set sleep interval to a new time lapse (e.g., 10 minutes), log receiver signal strength, log invalid received signals, log receiver frequency and phase, transmit logged data, etc.

A reply message is transmitted from the MT to the RL such that the RL can identify, locate, and receive data from the MT. The reply message is generated with a reply sequence generator that is keyed from the unique identifier (ID Code), similar to the transmit sequence generator. A low pass filter (e.g., LPF2) can be placed between the sequence generator and the transmitter (TXTR2) in the MT. Transmitter TXTR2 is coupled to antenna ANT4 via switch SW2 to cause the coded reply transmission (e.g., COM31, COM32).

Since an example MT operates with limited energy, the MT is normally operated in a low power or sleep mode. The energy consumed in the sleep mode is sufficient to operate a sleep timer. According to a pre-determined time interval, the MT is activated (e.g., wakeup is asserted by the sleep timer) and the MT looks for a signal to receive. When no identifiable signal can be received, the MT returns to the sleep mode.

Various timing signals that are employed by the MT (or MT) are generated by a time control circuit as illustrated in FIG. 1B. The processor is operated from one clock signal (CLK2), while the transmitter and receiver in the MT are operated by other clock signals (TCLK2 and RCLK2). The various timing signals are used by the system to digitally synthesize transmitter and receiver carrier wave signals from a locally generated oscillator signal in the MT.

The above described remote locator (RL) can be arranged to provide a relatively high power transmission signal (e.g., 1 Watt) over a long time interval (e.g., 2.5 seconds) to ensure that the MT has sufficient time to capture the necessary signals when it is active. The upper limit for energy that can be captured by the MT is determined by the radiated power from the RL multiplied times the capture time interval for the MT, multiplied times any loss factor due to the transmission path. An example transponder (MT) may be arranged to capture the signal from the RL for 157 μs, where the upper limit (ignoring path loss) for captured energy over the 157 μs time interval is approximately 157 μJules.

The MT can be arranged to transmit a very low power transmission signal (e.g., 10 mW) for a shorter time interval (e.g., 15.7 ms) than that for the RL (e.g., 2.5 s). The upper limit for energy that can be captured by the RL is determined by the radiated power from the MT multiplied times the capture time interval for the RL, multiplied times any loss factor due to the transmission path. For a 10 mW transmission over a 15.7 milli-second interval, the transmitted energy from the MT is approximately 157 μJules. The RL must be carefully arranged to capture signals form the MT such as by using an integration method as will be described later. It is contemplated that in one example embodiment, the MT will be implanted in a patient, and operated over at least several years using a watch-type battery.

The transponder (MT) is arranged to synthesize its own internal frequency for transmitting an acknowledgement signal by using the timing information that it acquires from the RL. The timing information that is received from the RL by the MT is Doppler shifted relative to the original transmission frequencies from the RL. The resulting synthesized frequency of the MT, while extremely accurate, corresponds to a Doppler shifted version of the original transmission frequencies form the RL. The acknowledgment signal from the MT is received by the RL, but is again Doppler shifted relative to the transmitting frequencies from the MT. The Doppler shift that result from the round trip of the signal transmissions (i.e., transmission from the RL to the MT, and reply transmission from the MT to the RL) is hereinafter referred to as the synthetic round-trip Doppler Shift.

Example Transmitter

Figure 2:
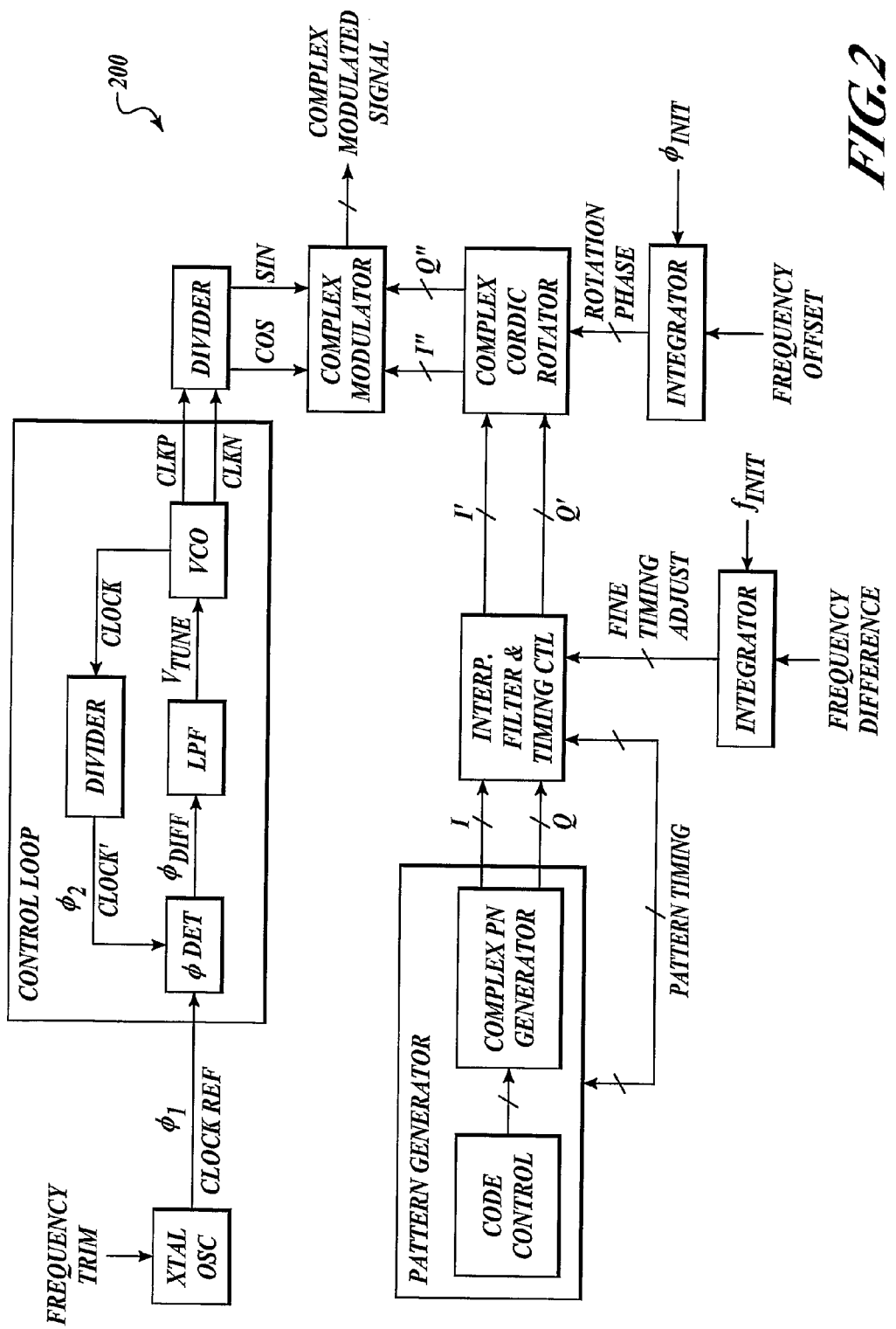
FIG. 2 illustrates an example transmitter.

FIG. 2 illustrates an example transmitter system. The transmitter system includes a crystal oscillator (XTAL OSC), a timing control circuit, a complex modulator, a pattern generator, an interpolation filter with timing control, integrators, and a complex cordic rotator.

The crystal oscillator is arranged to provide an oscillator signal as a clock signal (CLOCK) having a first phase ($\phi_1$) for the timing control circuit. In one example the crystal oscillator has a nominal frequency around 26.14 MHz, which can optionally be adjustable (e.g., via signal FREQ. TRIM). The oscillator can be a crystal-type oscillator, or any other oscillator that has a substantially stable oscillation frequency.

The timing control circuit includes a feedback control loop with an optional divider circuit that is arranged to synthesize a frequency. The control loop includes a phase detector, a low pass filter (LPF), a voltage controlled oscillator (VCO), and an optional divider circuit. The phase ($\phi_1$) of the reference clock signal (e.g., $CLOCK_{REF}$) is compared to a phase ($\phi_2$) from a feedback signal (e.g., CLOCK') by the phase detector to determine if the resulting clocks signal (CLOCK) is operating in phase with the reference clock ($CLOCK_{REF}$). The output of the phase detector corresponds to a phase difference signal ($\phi_{DIFF}$), which is provided to the low pass filter to generate a control voltage (VTUNE) for the VCO. The VCO adjusts the output frequency of clock signals CLKP and CLKN, which are out of phase with one another by 180 degrees. The feedback signal (CLOCK) is also provided from the VCO to the optional divider circuit. The output of the divider circuit is provided to the phase detector as signal CLOCK', which closes the control loop. Moreover, the VCO frequency can optionally be provided to another divider circuit, which generates synthesized frequencies that are associated with a sine and cosine function.

In one example, the VCO has a nominal output frequency of 1.83 GHz, the feedback loop divider circuit has a divide ratio of 70, and the phase detector is arranged to adjust the VTUNE signal via the low pass filter such that the average value of the 26.14 MHz signal is matched to 1.83 GHz/70. Other reference signals can be employed to yield the same result by adjusting the divider ratio in the control loop divider circuit. Moreover, the output of the VCO can be further adjusted by the output divider circuit (e.g., divide ratio of 2) to yield synthesized frequencies corresponding to SIN(915 MHz) and COS(915 MHZ) or any other desired frequency.

The pattern generator includes a code control block and a pseudo-noise generator block. The code control block is arranged to provide the pre-determined patterns, keyed from an ID Code, for "A", "B", and "C" sequenced patterns as will be described later. The pseudo-noise generator generates complex numbers (e.g., I and Q) from the codes based on the timing signals (pattern timing) for sequencing the pattern. In one example, the pseudo noise generator block is arranged to provide 2047 complex numbers. The complex sequence (I and Q) is provided to an interpolation filter and timing control block, which is arranged to adjust the fine timing associated with the I and Q signals, and provides I' and Q', which are associated with a complex interpolated baseband signal. An integrator circuit is used to integrate the difference between the transmitted and received frequencies to adjust the fine timing (fine timing adjust). The interpolator provides fine timing adjustment for the I and Q complex numbers (e.g., 4096/2047). The integrator circuit can be initialized by an initialization parameter such as $f_{INIT}$ and/or $\phi_{INIT}$.

The interpolated complex baseband signals (I' and Q') are provided to the cordic rotator. The cordic rotator adjusts the rotational phase of the complex baseband signals (in the digital domain) in response to a phase adjustment signal (e.g., rotation phase). The phase adjustment signal is provided by another integrator that integrates the frequency offset. The integrator circuit can again be initialized by an initialization parameter such as $f_{INIT}$ and/or $\phi_{INIT}$. The output of the complex cordic rotator is a frequency shifted complex baseband signal (I" and Q"), where the frequency shifting is undertaken by the digital synthesis operations by the interpolation filter and the cordic rotator.

The complex modulator is arranged to receive the frequency shifted complex baseband signals (I" and Q"), and the sine and cosine timing signals to provide a modulated signal output. The modulated signal output can be provided to a power amplifier (not shown) that is coupled to an antenna for transmission of the modulated signal. The various timing control signals (e.g., clock frequency, clock phase, clock offset) are adjusted such that the rate, fine-timing, and phase of the modulated signal output has sufficient timing information embedded in the resulting signal.

The code control is based on a unique identifier (ID Code). In one example, the unique identifier is provided to a polynomial generator. In another example, the unique identifier is stored in a volatile memory. In yet another example, the unique identifier is stored in a non-volatile storage such as a flash memory device, a ROM, an EPROM, an EEPROM, a dip-switch, or some other means. In still another example, the pattern that was created with the ID code is stored in a memory device or a look-up table instead of the unique identifier.

Example Transmission Sequence

Figure 3:
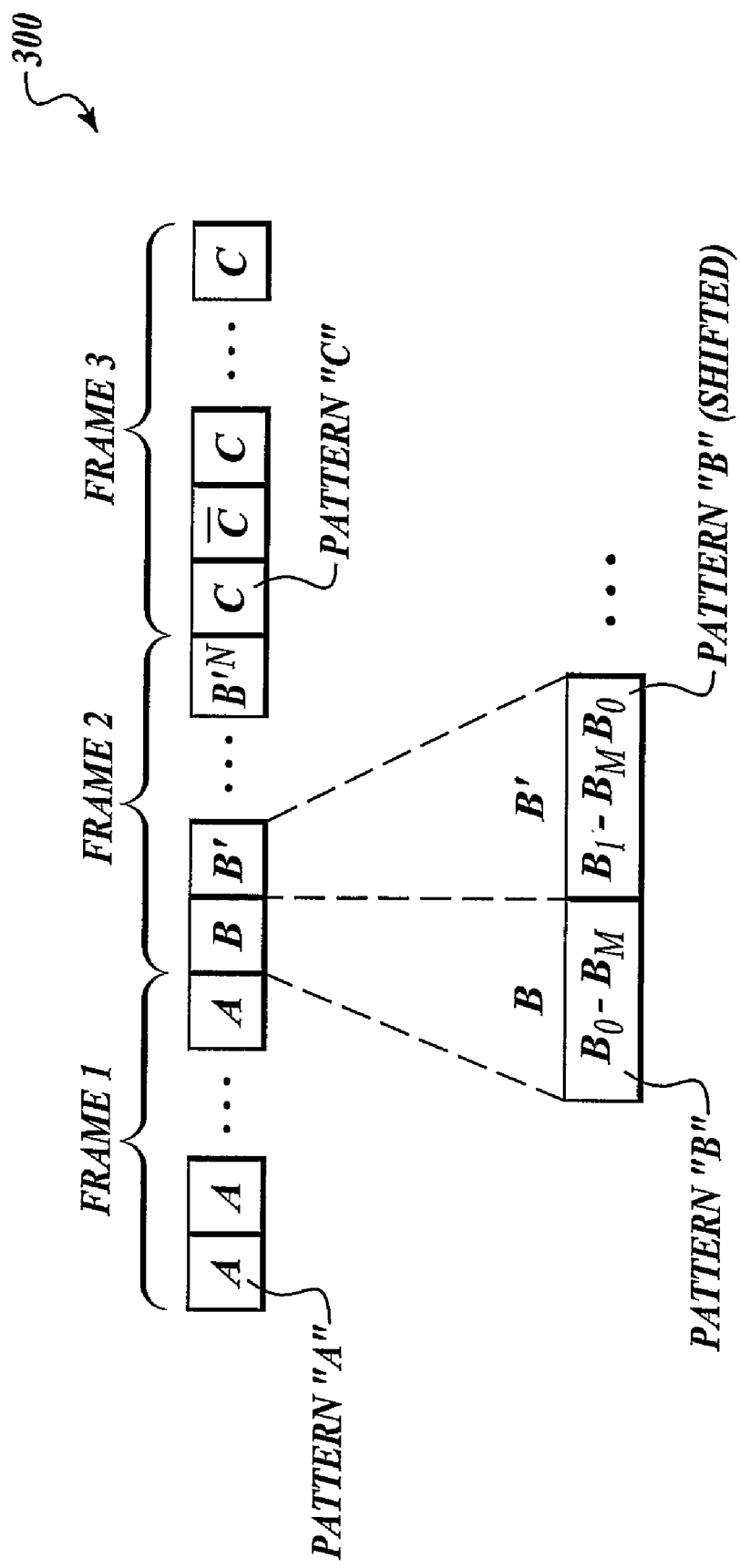
FIG. 3 is a diagram illustrating a set of frames formatted for transmission.

FIG. 3 is a diagram illustrating a set of frames formatted for transmission. A frame corresponds to a time-period for which a sequence is transmitted. For the example of FIG. 3, transmissions are broken into three sequential frames. During a first time-period, a first frame (i.e., "frame 1") is transmitted that consists of a first transmission sequence (i.e., "sequence A"). Sequence A consists of a repeated set of patterns that are in a sequential series, where each pattern (pattern A) is substantially identical. During a second time-period, a second frame (i.e., "frame 2") is transmitted that consists of a second transmission sequence (i.e., "sequence B"). Sequence B consists of a repeated set of patterns that are in a sequential series, where each subsequent pattern in the sequence is shifted as will be described later. During a third time-period, a third frame (i.e., "frame 3") is transmitted that consists of a third transmission sequence (i.e., "sequence C"). Sequence C consists of a repeated set of patterns, where each pattern (pattern "C") forms part of an encoded message as will be described later.

Each MT in the system has a unique identifier (e.g., an M-bit address) that is used to uniquely designate a specific MT. In one example, the unique identifier is a 33-bit address code that yields approximately 8.58 billion unique identifiers. The M-bit address can be dispersed over the various patterns. In one example, a 33 bit code is evenly dispersed over the three sequences such that 11-bits are coded in "sequence A", 11-bits are coded in "sequence B", and 11-bits are coded in "sequence C". In another example, the codes are not evenly dispersed over the transmission sequence. In still another example, the same code is used for each of the patterns.

The correlation of sequence "A" is used to verify that the first portion (e.g., the first 11-bits or bits 0-10) of the unique identifier is coded in the transmission. When a correlation is detected, fine baud and carrier timing can be derived. However, the MT has no prior timing information (e.g., no gross frame timing is known). Since the "A" pattern is repeated over the first-time interval, it is possible to accumulate the signals by adding them on top of one another before correlation is performed such that signal sensitivity is improved. In one example MT, the accumulation of signals is unnecessary. In another example MT, the accumulation of signals is performed during a repetitive tracking mode.

Once the "A" pattern has been acquired, the MT continues sampling to locate the "B" sequence. The correlation of sequence "B" is used to verify that the second portion (e.g., e.g., the second 11-bits or bits 11-21) of the unique identifier is coded in the transmission. As previously described, the "B" sequence is shifted over time. For example, a first B sequence includes coded bits B0, B1, . . . , BM, while the second B sequence (B') includes coded bits B1, B2, . . . , BM, B0. When correlation is achieved with the MT's "B" sequence, the MT identifies a stream position within the "B" sequence. Once the transmission stream position is determined from the shift pattern, the MT schedules the reception of sequence "C", whose arrival can now be predicted.

For the above described "B" sequencing example, a single bit shift is used between subsequent transmissions. Other shifting methods can be used such that the step size for shifting between subsequent transmissions can be a different integer number of shifts (e.g., 2, 3, 4, etc.) or a non-integer number of shift (e.g., ½ bit, ¾ bit, 1½ bit, 2¼ bit, etc.). In another example, the shifting mechanisms between subsequent transmission can be replaced by a carrier phase rotation, where each subsequent transmission has the carrier phase rotated by a fixed amount.

Frame "C" has a third portion of the unique identifier encoded therein, and possible command and control data for the MT (or other data for the RL). The correlation of sequence "C" is used to verify the third portion (e.g., the third 1-bits or bits 22-33) of the unique identifier is coded in the transmission. The "C" sequence can also be very slowly modulated with a few bits of data. For example, up to 63 bits of data and error correction code (ECC) can be transferred in sequence "C". In one example, the data is encoded by inverting or not-inverting patterns of "C" in the transmission frame. Examples of coded command and control information were previously described above.

For the above described "C" sequence, data is encoded using an inverting and non-inverting encoding method. Other data encoding methods can be used such as encoding the data with a shifting bit pattern similar to the "B" sequence. For example, a "000" binary code can be encoded, and each increment in the binary code is the same pattern shifted by an incremental shift step (e.g., ½ bit step, 1 bit step, 2 bit step, etc.). The data message nominally in "C" can be encoded with a pattern timing changes as in the nominal section "B" previously described.

The MT transmits sequences A and B in substantially the same format as that described above. However, since the RL initiated the transmission and does not have a "wake-up" period creating an ambiguity in when reception begins, the transmission sequence from the MT can be shorter overall. The shortened transmission period helps minimize the MT's energy consumption. Frame "C" is similarly formatted, but may include other reported data such as: current temperature, heart rate, blood pressure, etc.

The timing and carrier signals for transmission in the MT are derived from the RL's clock as measured against the internal MT clock. The RL in turn correlates these signals, similar to the MT, and determines the exact round-trip time. The RL also determines deviations in the signal timing with respect to its own clock, which the MT attempted to mimic. The deviation in the signal timing is a consequence of Doppler shift, noise, and oscillator instability.

An example system has the following general information:
Frame consists of 4096 samples, 2047 baud;
Sample Rate is 25.777M complex samples/sec;
Baud Rate is determined by Sample Rate*(2047/2048)/2=12.8822 Mbaud symbols/sec, QPSK; and
Frame Period is 158.98 μs.

An example system has the following RL TX parameters:
"A" sequence is 2.2263 seconds long, (13×1024 frames), repeated un-shifted with one of 2047 first address portions;
"B" sequence is 317.96 ms long (2000 frames), repeated shifted with one of 2047 second address portions; and
"C" sequence is 19.174 ms long (64 frames), repeated un-shifted with one of 2047 third address portions, frames inverted according to modulated data.

An example system has the following MT TX parameters:
"A" sequence is 81.397 ms long, (512 frames);
"B" sequence is 20.349 ms long (128 frames); and
"C" sequence is 10.174 ms long (64 frames), repeated un-shifted with one of 2047 third address portions, frames inverted according to modulated data.

Example Timing Acquisition Sequence

Figure 4A:
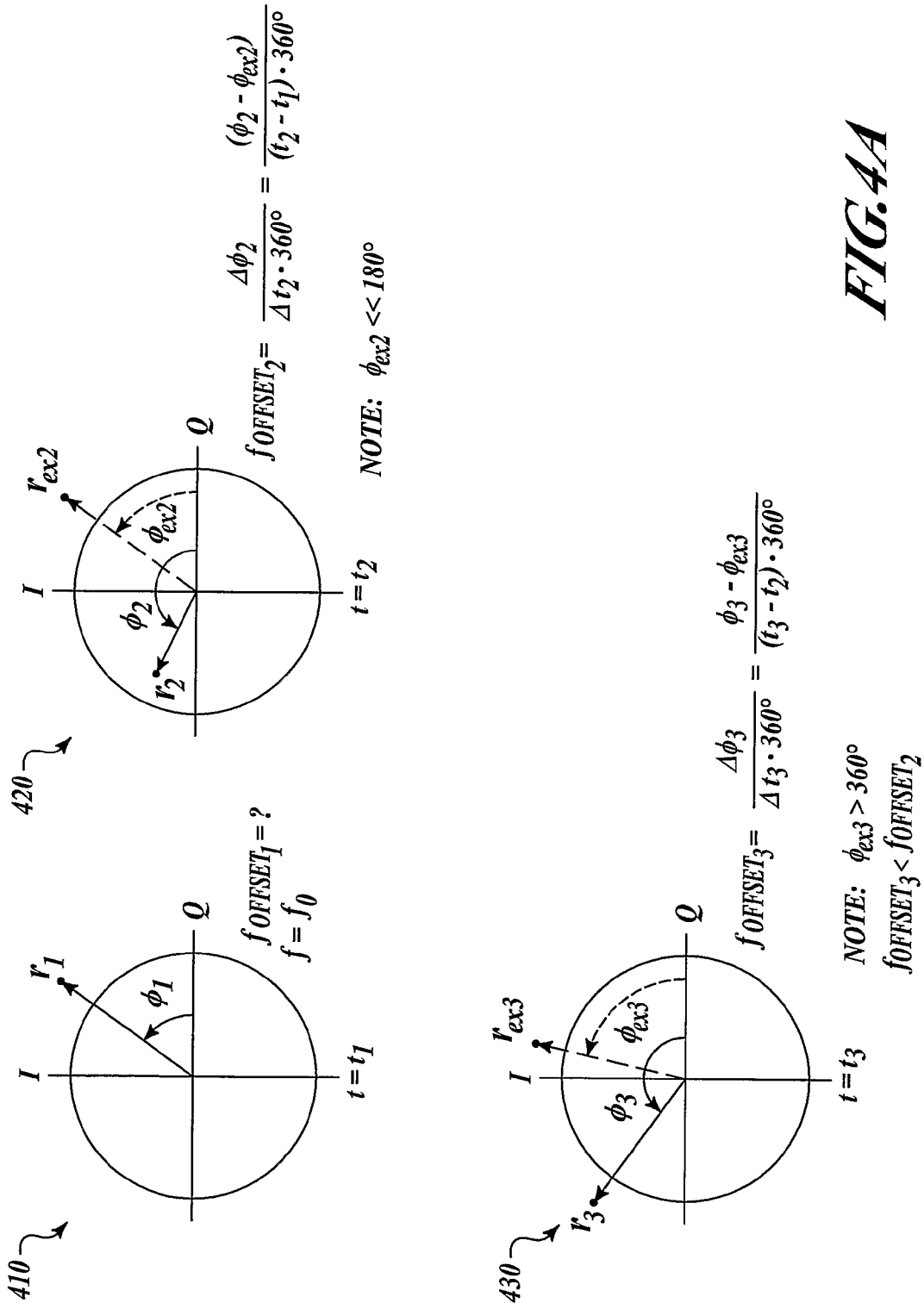
FIGS. 4A and 4B are diagrams illustrating the timing acquisition for an example communication system.
Figure 4B:
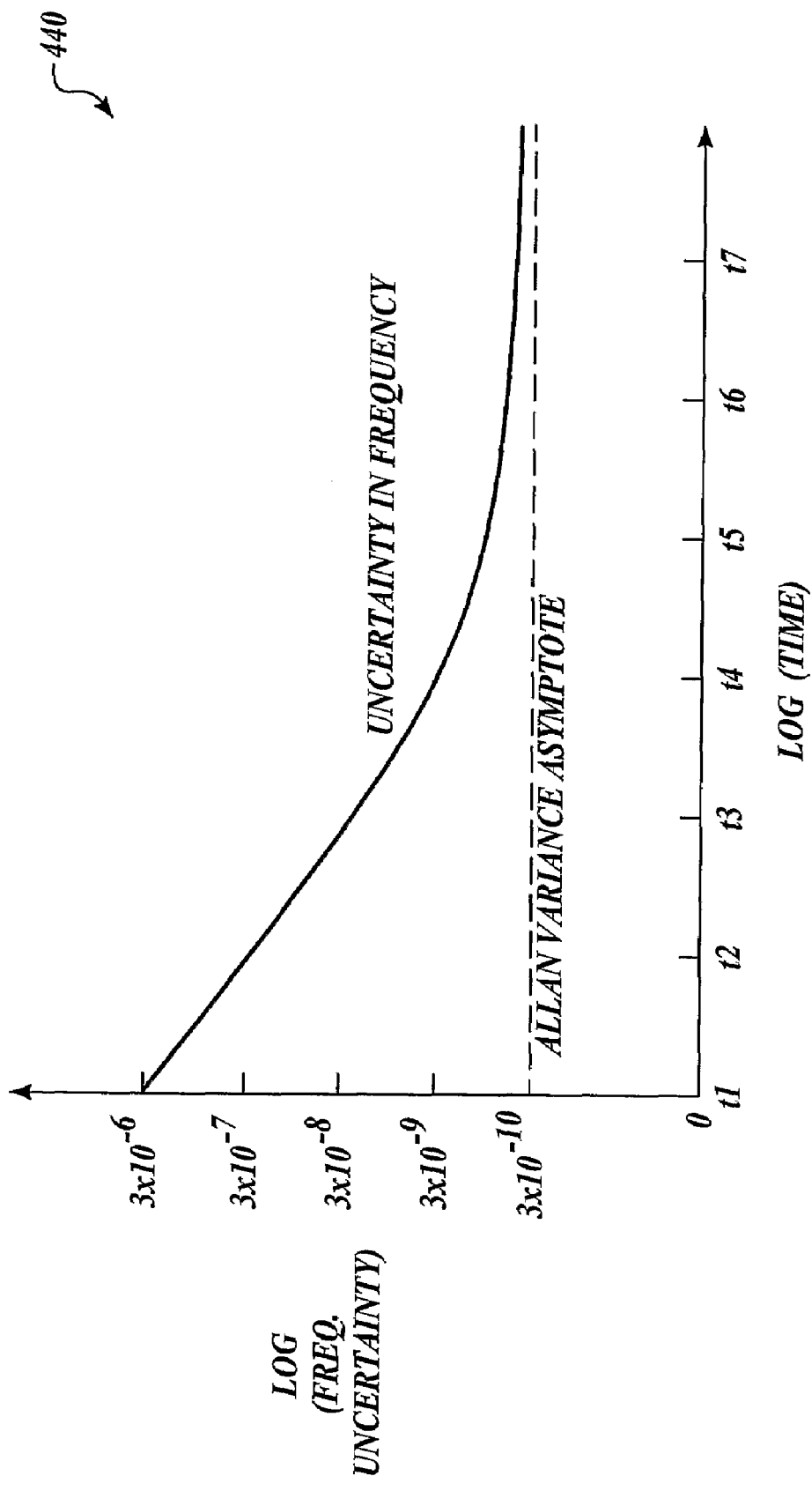

FIGS. 4A and 4B are diagrams illustrating the timing acquisition for an example communication system. The described timing acquisition sequence may be employed by the MT when receiving the three-part transmission sequence described previously with respect to FIGS. 1A, 1B, 2 and 3. However, as described herein, the timing acquisition sequence can be accomplished with only two of the three portions of the transmission sequence (e.g., sequence A and sequence B).

The receiver frequency is digitally synthesized from a locally generated clock circuit (e.g., a crystal oscillator). The carrier wave from the RL is also digitally synthesized from its own locally generated clocking circuits, and will likely be mismatched from the receiver frequency in the MT. The mismatch may be related to thermal differences in the operating environment, heat transients in the circuits, crystal tolerances, processing differences between the MT and the RL, as well as other non-ideal effects. Moreover, the overall system is not synchronized so there is no way to initially know the starting phase, frequency and cadence associated with the transmissions. FIG. 4A illustrates examples of phase and frequency determinations associated with an example "pattern A" sequence, while FIG. 4B illustrates the uncertainty in the receiver frequency over time during the timing acquisition.

The receiver portion of the communication system is initialized at time $t_1$ to an initial frequency (f) that is designated as $f=f_0$. However, the offset between the digitally synthesized receiver frequency and the carrier frequency from the received transmission is unknown at time $t=t_1$. The MT is arranged to measure the phase associated with the received signals from pattern A as phase $\phi_1$. The phase measurement (e.g., $\phi_1$) can be generated by an output of the correlator.

At time $t=t_2$, another portion of the transmission of pattern A is received, and the MT is arranged to measure the phase as $\phi_2$, and calculate a frequency offset error associated with the difference between the expected receiver frequency and the actual carrier wave from the RL's transmission. The frequency offset ($f_{offset2}$) is determined by the difference in the phases and the elapsed time between transmissions as: $f_{offset2}=[(\phi_2-\phi_{ex2})/[360(t_2-t_1)]$, where $\phi_{ex2}$ corresponds to the expected phase at time $t_2$. It is important to note that the elapsed time for the first two measurements should be short enough to result in an expected relative phase difference of substantially less than 180 degrees to ensure that unresolveable ambiguities do not occur. Notice that the expected phase for this time corresponds to $\phi_1$.

At time $t=t_3$, another portion of the transmission of pattern A is received, and the MT is arranged to measure the phase as $\phi_3$, and calculate a frequency offset error associated with the difference between the expected receiver frequency and the actual carrier wave from the RL's transmission. The frequency offset ($f_{offset3}$) is determined by the difference in the phases and the elapsed time between transmissions as: $f_{offset2}=[(\phi_3-\phi_{ex3})/[360(t_3-t_2)]$, where $\phi_{ex3}$ corresponds to the expected phase at time $t_3$. It is important to note that the elapsed time for the first two measurements should again result in an expected relative phase difference of substantially less than 180 degrees to ensure that unresolveable ambiguities do not occur. However, the absolute phase difference is expected to be significantly larger than 360 degrees such that the time difference between successive offset calculations can be gradually spaced further and further apart as the timing acquisition is adjusted by each subsequent estimate. Notice that the frequency error is gradually reduced with each subsequent adjustment until limited by the Allan Variance.

FIG. 4B is a graph illustrating the uncertainty in the digitally synthesized receiver frequency over an elapsed timing acquisition period. Note that the scale for both axes is logarithmic, and that the uncertainty will asymptotically approach the Allan Variance associated with the local oscillator circuits in the MT (or the RL as the case may be). The horizontal axis illustrates elapsed time, while the vertical axis illustrates the uncertainty in the frequency. Each successive time period has a refined estimate of the receiver timing such that the uncertainty decreases in an exponential fashion. A knee in the uncertainty curve occurs after sufficient samples of the received signal are acquired (e.g., at time $t_5$) such that estimates for the received carrier wave frequency asymptotically approach a minimum uncertainty that is determined by the Allan variance.

Example Receiver

Figure 5A:
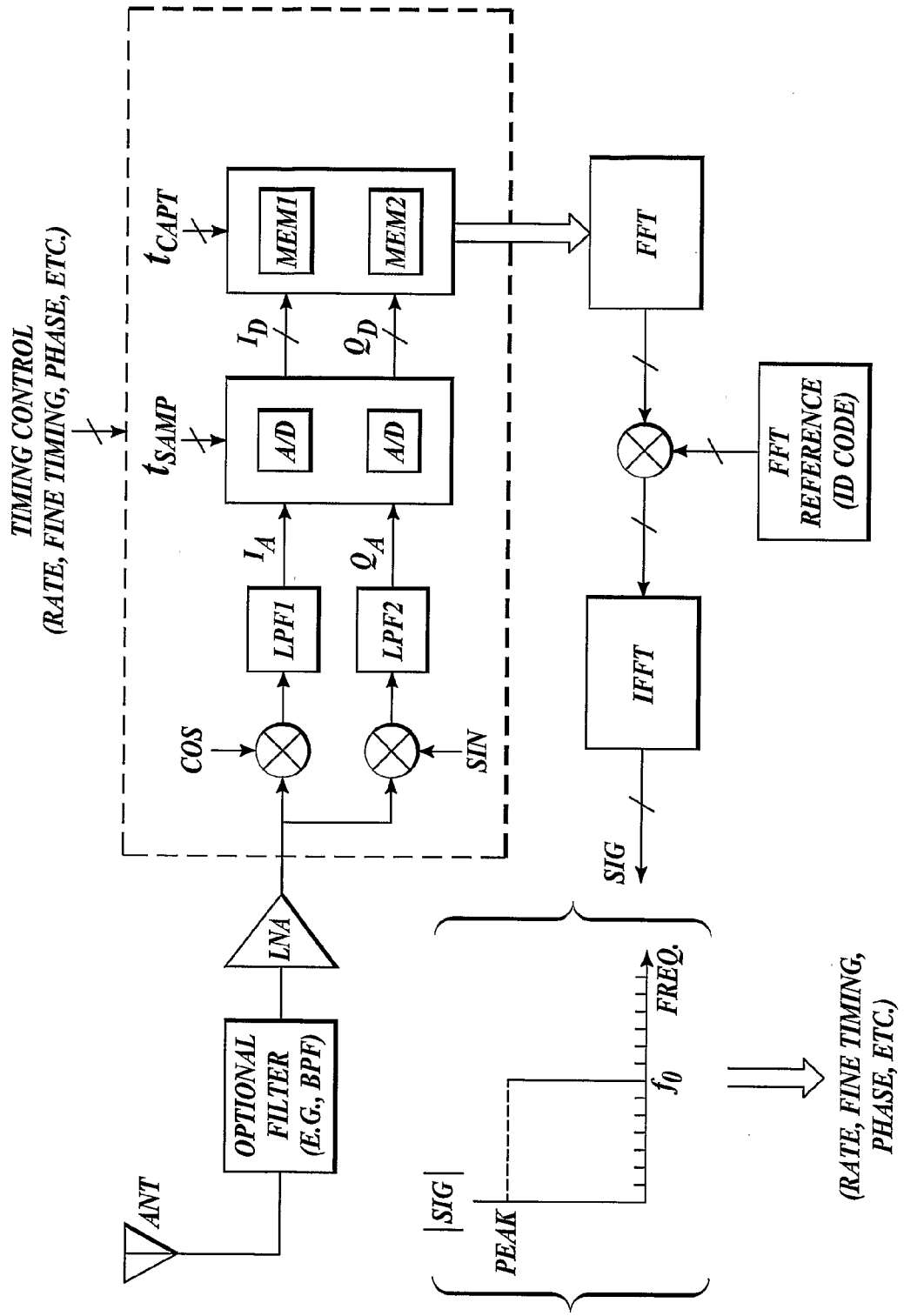
FIGS. 5A-5B are example diagrams for example receivers.

FIG. 5A is a block diagram for an example receiver. The example receiver includes an antenna (ANT), an optional filter, a low noise amplifier (LNA), a first mixer, a second mixer, a first low pass filter (LPF1), a second low pass filter (LPF2), an analog-to-digital converter (ADC), a buffer, an FFT processor, a correlator, and an inverse FFT processor.

The antenna is arranged to couple received signals to the LNA through the optional filter (e.g., a band-pass filter). The LNA is arranged to increase signal strength, and couple the increased signal to the mixers. The first mixer is arranged to generate an in-phase signal (I) with a cosine wave heterodyne, while the second mixer is arranged to generate quadrature signal (Q) with a sine wave heterodyne. The in-phase signal is coupled to the ADC via LPF1 as signal $I_A$, while the quadrature-phase signal is coupled to the ADC via LPF2 as signal $Q_A$.

The ADC is operated at a sampling frequency ($f_{SAM}$). The ADC can be implemented as a single A/D converter circuit with time division multiplexing between the $I_A$ and $Q_A$ signals. The ADC can alternatively be implemented as two separate A/D converter circuits. The ADC circuits convert the $I_A$ and $Q_A$ signals to quantized digital signals that are coupled to the buffer as signals $I_D$ and $Q_D$, respectively. The buffer can be implemented as one contiguous memory, as partitioned memory (e.g., MEM1, MEM2, etc.), or any other appropriate temporary storage that buffers the captured data.

The output of the buffer is coupled to the FFT processor, which converts the input signal to the frequency domain. The FFT of the reference signal is complex conjugate multiplied with the frequency domain representation of the captured signal. An inverse FFT of the product is taken, which is the circular correlation of the captured signal and the selected reference signal. Since the FFT reference is determined from the unique identifier of a MT (e.g., ID Code), the correlation of the FFT processor output will peak when a valid received code is identified in the signal. The carrier phase and pattern timing are also extracted from the received signals.

Once the timing of the circular correlation is known, the timing drift for subsequent captures is relatively small. When timing is known, an example direct form binary complex correlation direct form can be accomplished with calculations on the order of 4N additions or subtractions, which is drastically less than the order of 4*N*N additions for a full sequence direct form correlation, and is meaningfully less even than the Order of 4*N*LOG2(n) operations required for an FFT based general correlation.

Figure 5B:
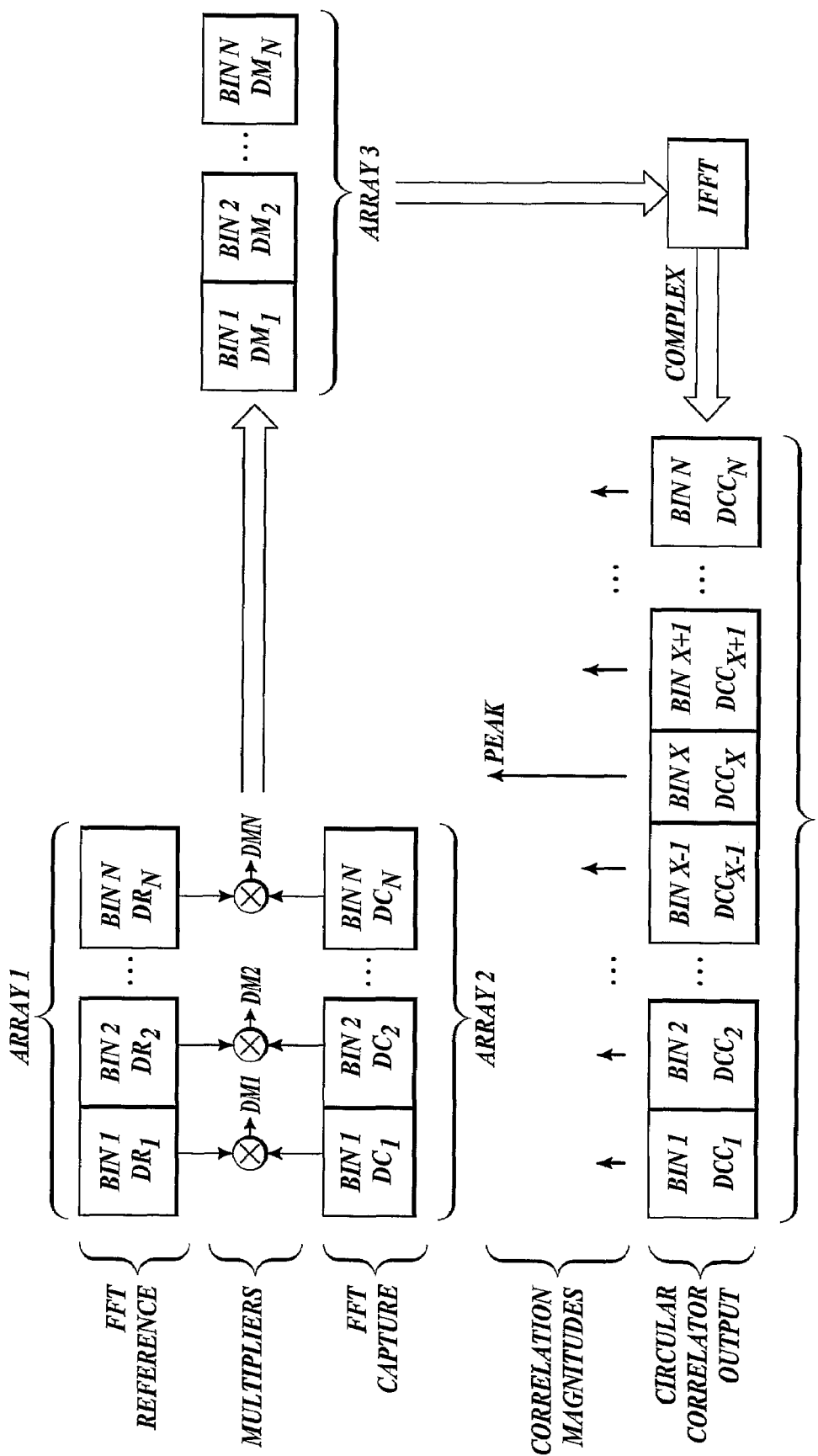

FIG. 5B illustrates operations in a receiver that may be performed as a DSP block. The FFT reference signal is provided as an array of N-bins. The captured signal is calculated as an FFT, also of N bins. Next, the complex conjugate of each complex element in a designated storage bin (BIN 1-BIN N) is multiplied by the data from the other corresponding storage bin. For example, the complex conjugate of the FFT reference signal is stored in a first array (ARRAY 1) as $D_{R1}$-$D_{RN}$, and the FFT capture data is stored in a second array (ARRAY 2) as $D_{C1}$-$D_{CN}$. In another example, the FFT reference signal is stored in the first array (ARRAY 1) as $D_{R1}$-$D_{RN}$, and the complex conjugate of the FFT capture data is stored in the second array (ARRAY 2) as $D_{C1}$-$D_{CN}$.

The multipliers are arranged to receive data from the first array and the second array to provide a multiplied output, yielding a product result that can be stored in a third array (ARRAY 3) as $D_{M1}$-$D_{MN}$. An inverse FFT is computed from the product identified in the third array (ARRAY 3), to retrieve the circular correlator output. The circular correlator output results can be stored in a fourth array (ARRAY 4), or can optionally overwrite the values from the third array (ARRAY 3). The contents of the fourth array (ARRAY 4), or the third array depending on the implementation, are a complex result that includes both magnitudes and phases. As illustrated in FIG. 5B, the inverse FFT of the circular correlator output has a peak magnitude (PEAK) that occurs when the FFT reference ad the captured data correlate with one another. Each bin (BIN1-BIN N) of the third array (ARRAY 3), or fourth array depending on the implementation, corresponds to the output of the correlator, wherein a PEAK may be located in one of the bins (e.g., BINX), when a correlation occurs.

Example Operational Flow

Figure 6:
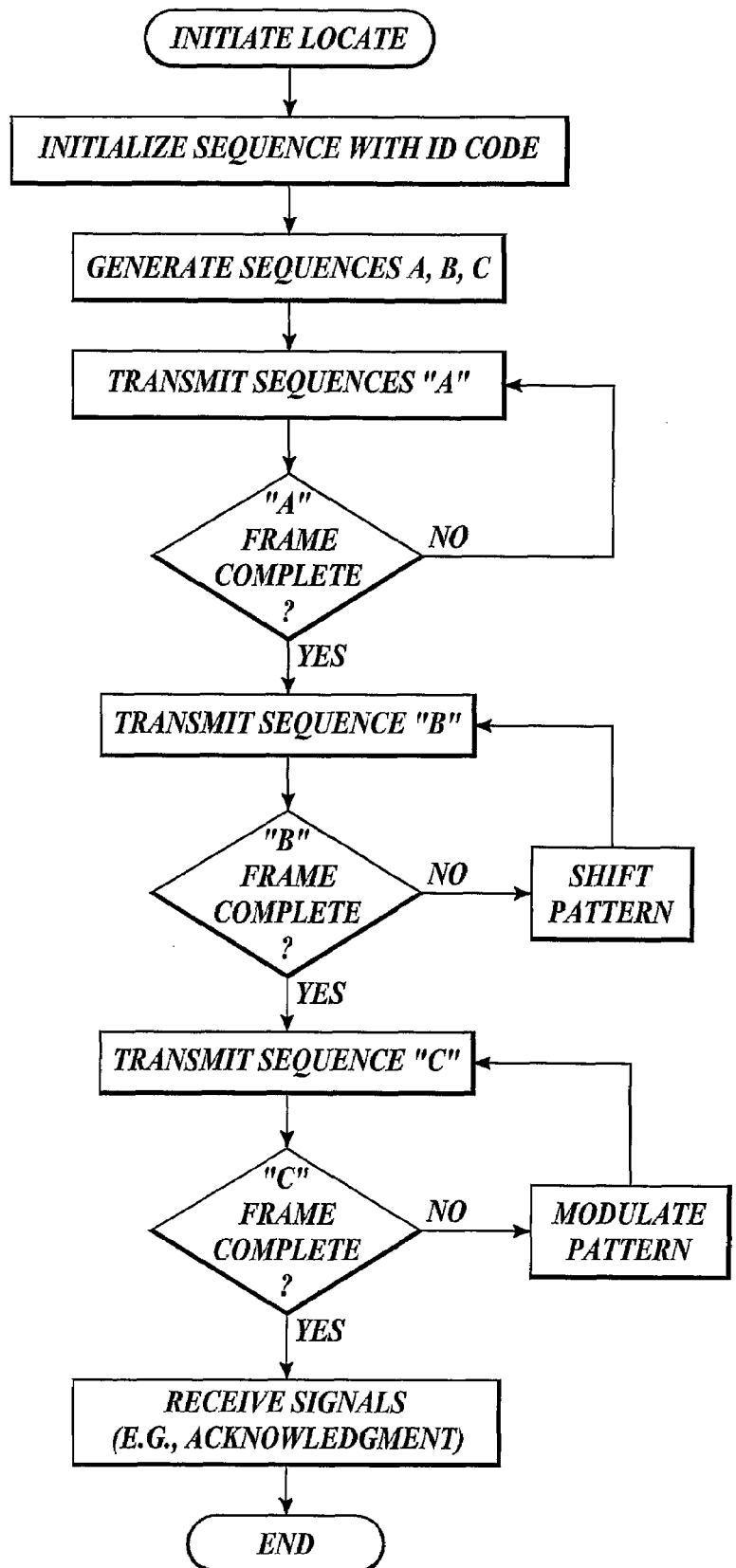
FIG. 6 is a flow-chart for an example transmitter.

FIG. 6 is a flow chart for an example transmitter in either a MT or a receiver. Processing begins when a user, or some other process, initiates a request to locate a particular MT.

A transmission sequence is initialized with a unique identifier (ID Code). Sequences are generated for frame transmission such as sequence "A", "B", and "C" as previously described. Each of the "A", "B", and "C" sequences are encoded with a portion of the unique code.

Next, the RL (or MT) then begins transmitting pattern "A", and repeats transmitting pattern "A" (Note: un-shifted) until the entire "A" sequence is completed (e.g., 13×1024 sequential patterns, or frame "A"). The RL then begins transmitting pattern "B". For each subsequent transmission of pattern "B", the pattern is shifted such as using a bit rotation algorithm, as previously described. After the entire sequence of "B" patterns is transmitted (e.g., 2000 sequential patterns, or frame "B"), the RL begins transmitting the "C" pattern. The sequence of "C" patterns includes modulated data that may correspond to command and control information for the MT. After the modulated data is transmitted (e.g., 64 sequential pattern, or frame "C"), the RL stops transmitting and switches into a receive mode.

In the receive mode, signals are received from the MT with the RL in a similar format as provided between the RL and the MT. The RL can then calculate a distance and location based on the round-trip time and Doppler shift in the received signals as previously described. Moreover, the received "C" frame transmission may include data that is communicated between the MT and the RL, which is extracted and evaluated by the RL. Such data may include: physiological information such as heart rate, body temperature, blood pressure, heart rhythm, blood-sugar level, as well as other sensory information that is associated with a user of the MT.

Figure 7A:
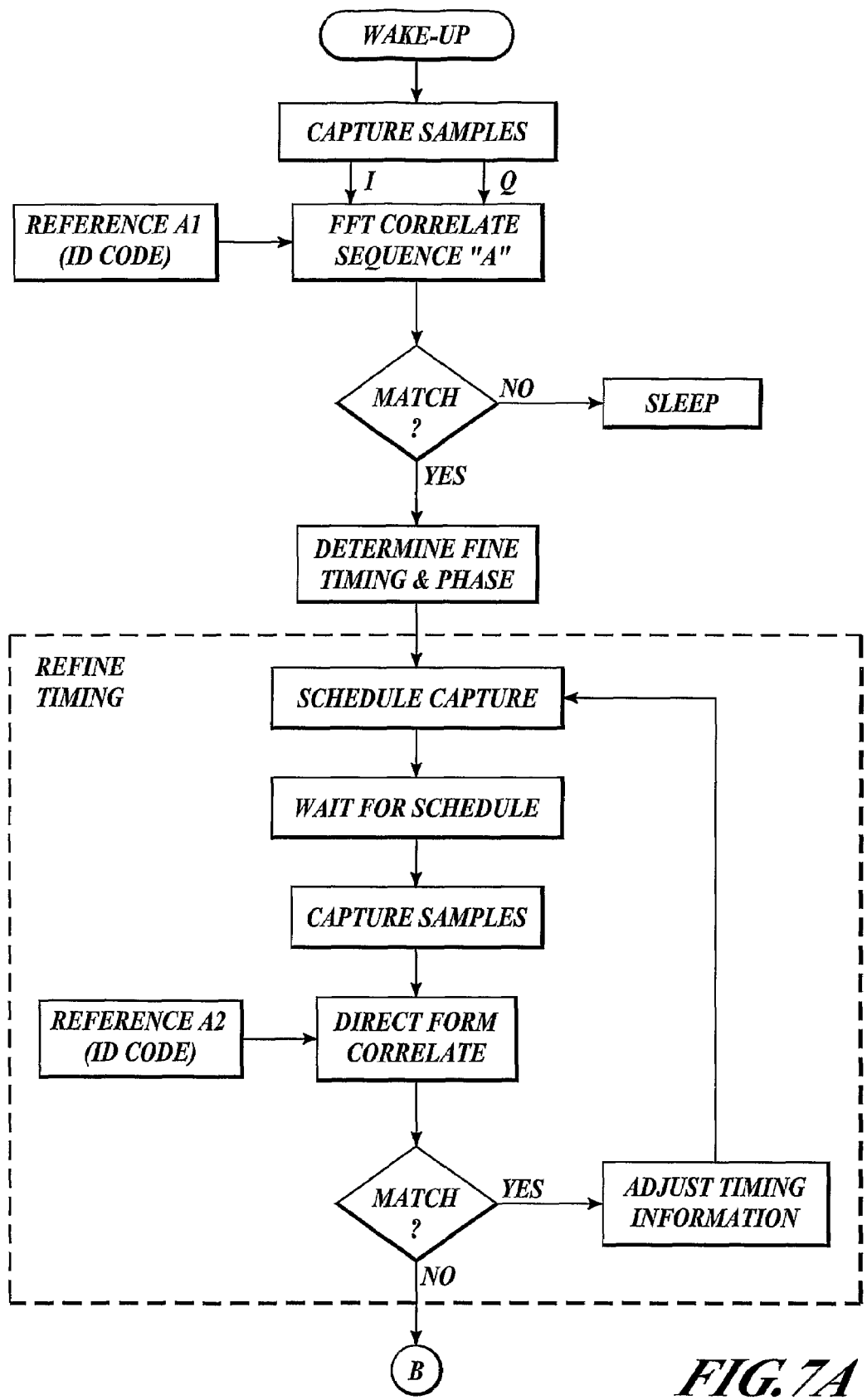
FIGS. 7A-7B, 8A-8B, and 9 are flow-charts for example receivers, arranged in accordance with at least one aspect of present disclosure.

FIG. 7A is an example flow chart for an example receiver in a MT. Processing begins when the MT is activated out of a sleep mode (e.g., WAKE-UP is initiated). FIG. 7A illustrates the capture of samples associated with sequence "A" (or frame "A"). After wake-up is initiated, the receiver captures noise and/or signals. The MT will attempt to correlate the captured noise and/or signals with the first portion of the unique identifier for the specific MT. When the correlation fails to match, the MT determines that the transmission is intended for another device, or possibly that no transmission is present, and returns to a sleep mode. Alternatively, the MT extracts baud and carrier timing information from the transmission sequence to refine the receiver timings.

Timing is refined by repeatedly scheduling capture intervals. The receiver waits, and then begins capturing a portion of the samples from each scheduled capture time, and attempts to correlate the captured samples with another portion of the reference that is keyed to the code for the MT. Each time the correlation indicates a match, the timing for the receiver is adjusted (bootstrapped) to further refine the time/frequency estimates. Eventually, the correlation of pattern A fails to match the coded reference and processing continues to capture and evaluate pattern B as will be described with respect to FIG. 8A.

Figure 7B:
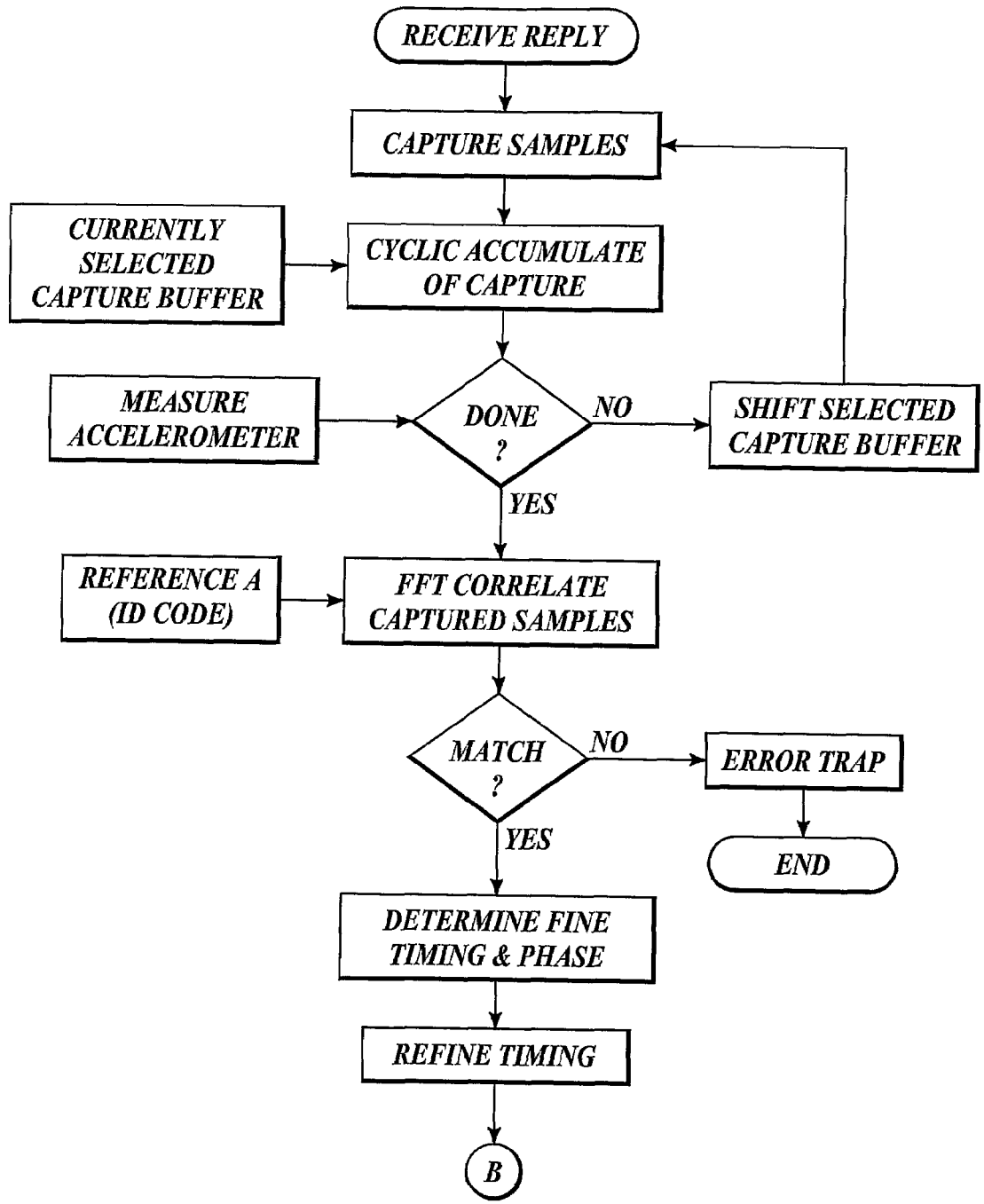

FIG. 7B illustrates the capture of samples associated with sequence "A" (or frame "A") in a receiver of a RL device. Since the MT has limited power available for transmission, the signal may be considerably weaker than that from the RL. After wake-up is initiated by the RL, the receiver captures noise and/or signals. The RL will continue to capture the transmission for a predetermined time interval and accumulate values using a cyclic accumulation capture technique (e.g., an array of capture buffers that are cyclically selected in sequence). For each subsequent capture, the selected capture buffer is changed based on the time. Also, an accelerometer is used to measure the speed of the RL device for estimating time for reception, etc.

After the predetermined time interval expires, the RL attempts to FFT correlate the accumulated/captured signals and noise with the first portion of the unique identifier for the specific RL. The accumulation of the captured patterns over the sequence using the described cyclic accumulation improves the signal levels and minimizes the impact of noise on the reception. When the correlation fails to identify a match, the RL determines that the transmission is intended for another device, that no transmission is present, or that an error has occurred, and returns to a sleep mode. Alternatively, the RL fine timing and phase information from the transmission sequence is used to refine the receiver timings for the RL.

Processing then continues to capture and evaluate pattern B as will be described with respect to FIG. 8B.

Figure 8A:
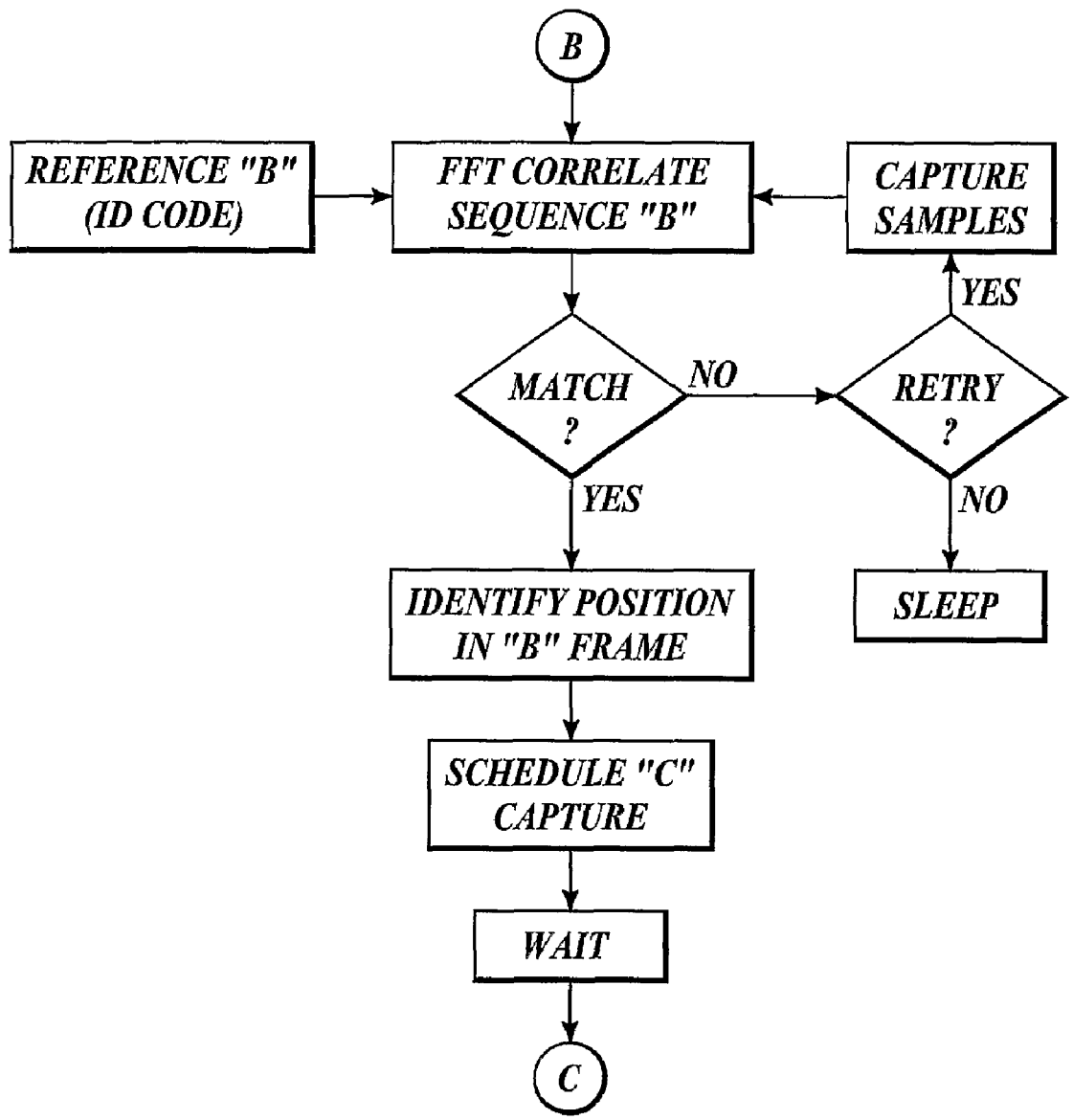

FIG. 8A illustrates the capture of samples associated with pattern "B" in a MT device. The receiver captures a sequence of samples, assuming those samples correspond to sequence "B". The MT will attempt to FFT correlate the captured samples with the second portion of the unique identifier for the specific MT. When the correlation fails to identify a match, the MT may determine that the signal sequence is intended for another device. During a processing time interval, the expected B sequence is shifted and captured, and FFT correlation determinations then follow. When the processing time interval completes without a match of sequence "B", the MT determines that the transmission is intended for another MT or that there is no transmission to receive and returns to a sleep mode. Alternatively, if the MT finds a match for sequence "B", then the MT determines the relative position of the matched pattern within the sequence (or within the frame) based on the shift position that yields a match. Since the timing, phase, and frequency information are now known, the MT schedules reception of the "C" sequence. Processing continues for the MT in FIG. 9, which follows further below.

Figure 8B:
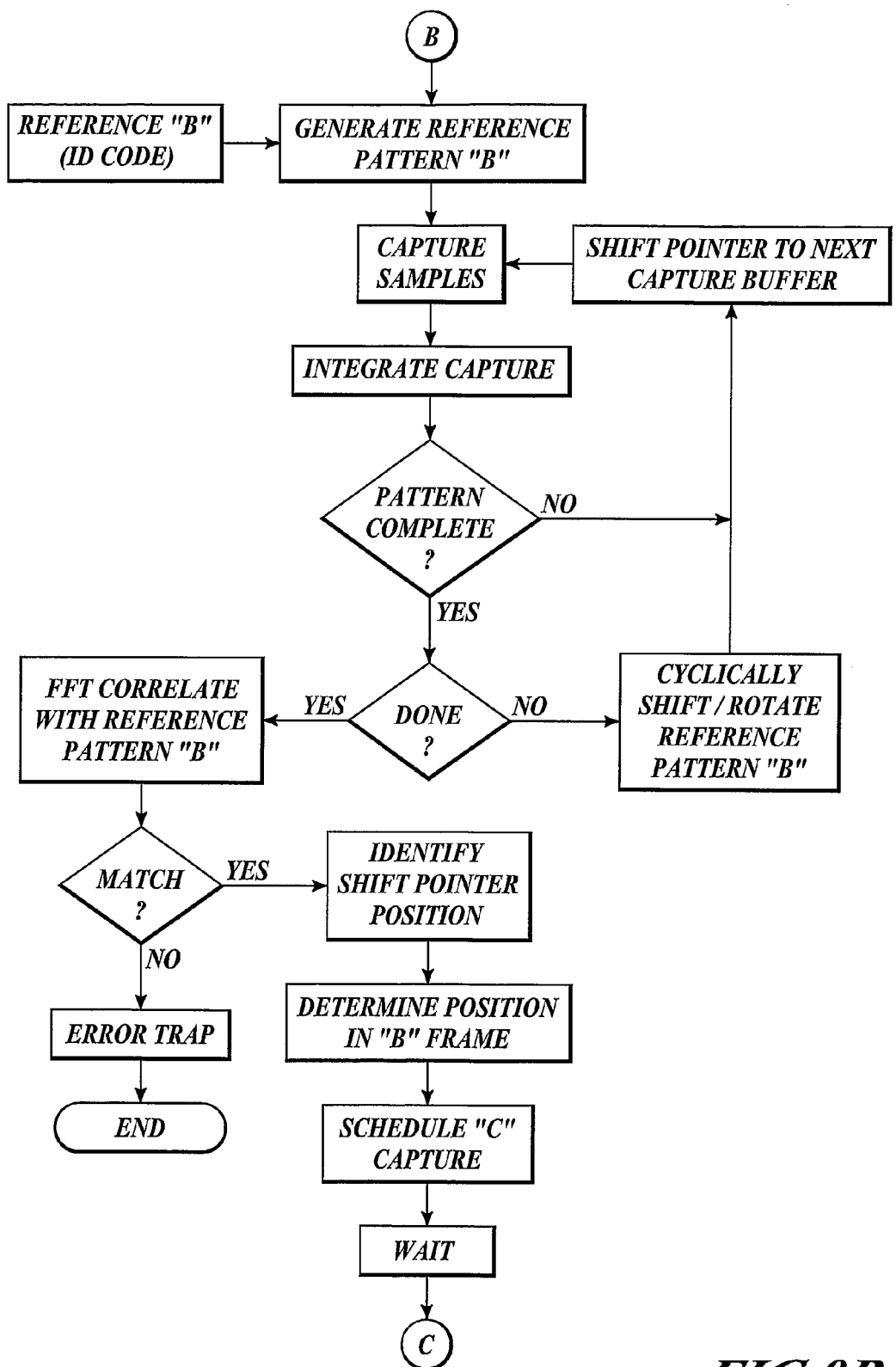

FIG. 8B illustrates the capture of samples associated with pattern "B" in a RL device. The receiver captures a sequence of samples, assuming those samples correspond to sequence "B" using a cyclic accumulation/integration technique that is similar to that previously described for FIG. 7B. Initially a reference pattern associated with pattern "B: is generated. Each received sample from a portion of a capture sequence is captured and placed in a respective one of a series of buffers, where each buffer has an associated index such as a pointer. Until the entire sequenced pattern has been captured, each subsequent captured sample is placed in a different capture buffer (e.g., a capacitive storage cell).

After all of the samples for a pattern sequence (e.g., 4096 samples from a sequence of pattern "B") are received (i.e., "pattern complete"), the RL will attempt to FFT correlate the integrated captured sequence with the previously generated pattern for pattern "B". When the FFT correlation fails to identify a match, the RL falls into an error trap. Processing a received sequence may expire without match when the transmission is intended for another MT, or perhaps when an error has occurred. An error trap handles the remaining processing when an error occurs.

As time moves forward, the reference pattern for "sequence B" must be rotated using a cyclic rotating process as previously described so that the reference pattern is aligned with the transmitted cyclically rotated pattern. The described rotated pattern is illustrated and described as Pattern "B'" with respect to FIG. 3. When the RL finds a circular correlation match for the generated pattern "B" (or any subsequently rotated version thereof), the RL can then determine the relative position of the matched pattern within the sequence (or within the frame) based on the circularly rotated (e.g., shifted) pattern that yields a match. Since the timing, phase, and frequency information are now known, the RL schedules to receive the "C" sequence. Processing continues for the RL in FIG. 9, which follows below.

Figure 9:
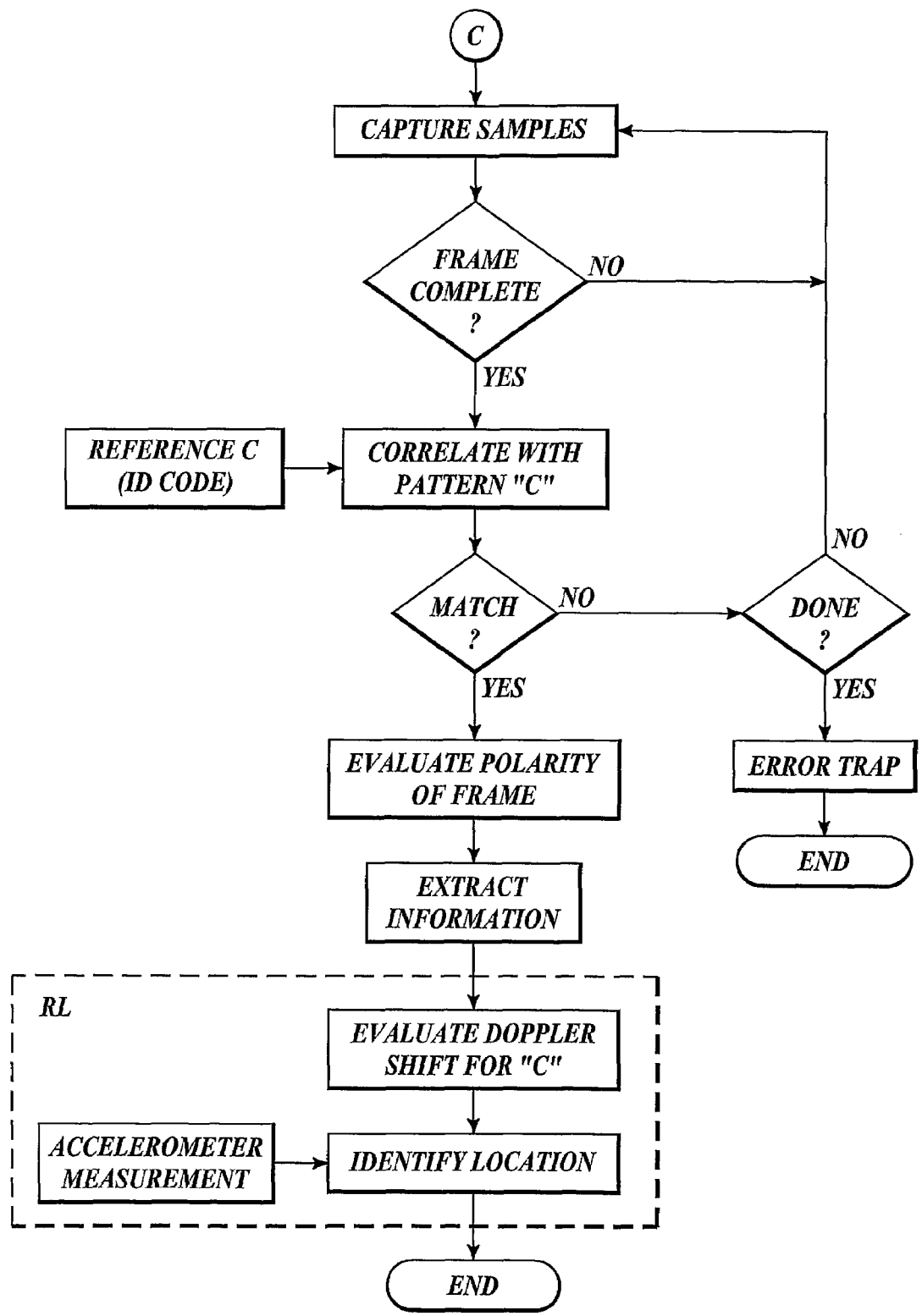

FIG. 9 illustrates the capture of samples associated with sequence "C". The receiver captures samples from the receiver in the MT, assuming those symbols correspond to pattern "C". The MT will continue to capture samples until the frame is expected to reach completion. The MT will then attempt to correlate the captured sequence (assuming it is sequence "C" from the RL) with the third portion of the unique identifier for the specific MT. When the correlation fails to achieve a sufficient level for detecting a match, we can assume as a formality that the transmission of the "C" sequence has failed for any number of reasons (excessive noise in the environment, a high strength interfering signal, etc.) Since we know precisely when transmission of sequence "C" should occur, and what carrier frequency, phase, timing, and cadence for which transmission should occur, the receipt of the "C" pattern can be used formalistically for verification of a valid transmission.

Sequence "C" includes data modulated therein that may be coded with error correcting codes (ECC), where the coded information can be phase modulated and subsequently demodulated and decoded. When the time-period has not expired, capturing of the expected C sequence is resumed, followed by correlation determinations again. When the time-period has expired without a match of sequence "C", the MT determines that the transmission is intended for another and traps an error condition appropriately. Alternatively, the MT finds a match for pattern "C" and evaluates the polarities of the symbols received in this frame, and extracts command and control information from the "C" sequence.

In the case of the MT, the completed capture of sequence C is followed by a transmission of sequences "A", "B", and "C2" (or some other order, perhaps, or even a different set of A'B'C'. Sequences "A" and "B" include a similar pattern as previously described for the RL, although shorter in length. Sequence "C2" is still the same number of frames except that data is encoded into the transmission for communication between the MT and the RL.

In the case of the RL, the completed capture of sequence C is followed by evaluation of the round-trip time to determine linear distance from the RL to the MT. A time difference is evaluated between the reception of two signals that are received from two different receiving antennas to help identify a vector for direction between the RL and the MT. An analysis of a Doppler shift in the received signals from the MT can also be used to assist in the determination of the directional vector. In addition, sequence "C" is evaluated to extract transferred information from the MT to the RL.

An accelerometer is included in the RL to assist in identification of the location based on the speed associated with the RL. Once the round-trip time and the Doppler shift are known, the information can be combined with the speed and heading of the RL to identify a direction and distance from the RL to the MT.

Example Operational Features and Observations

The present disclosure merges "location request" polling with the location process itself. The RL device is arranged to provide a relatively lengthy, powerful, coded signal whose duration spans the polling interval of the MT. The MT very briefly samples the relevant spectrum, and finds a coded spread spectrum signal. In this event, the MT performs multiple signal captures from the lengthy transmission, making successively more accurate estimates of the signals frequency, cadence, and time reference. These estimates are limited in precision by the short-term stability (root Allan variance) of the MT's time base (e.g., a quartz crystal oscillator) and by the relative acceleration between the RL and the MT. This Allan variance will typically be better than 1 part per billion, but the acceleration for observation periods of 0.25 seconds may be the order of: 10 meters/sec$^2$ by 0.25 seconds, which would give a 2.5 meter/second Doppler change. This lurch is unusual, and typically, a 0.25 meter/second change or less is observed. A velocity change of 0.25 meter/second round-trip is 0.5 meter/second, which is a Doppler change of $0.5/3*10^8$, or 1.6 parts per billion (ppb). Thus, the estimates of incoming signal frequency/sequence should have a precision of approximately two (2) parts per billion or better. Experimentally, two (2) ppb has been observed.

The MT can use the precise estimate of the received signal timing to synthesize a coded spread spectrum reply with substantially the same timing and carrier frequency. This reply signal is emitted shortly after the end of the incoming signal. Since the timing is accurately captured, the presence of a delay or gap doesn't materially degrade accuracy. For example, if the time-base error is 2 ppb, then a 30 ms delay translates into a time uncertainty of approximately 60 ps, which is about one centimeter of round trip distance.

The coded reply signal from the MT is sufficiently lengthy so that integration over time compensates for its relatively low power. The signal from the MT can be coherently processed by the RL since the return signal is coherent plus or minus the synthetic round-trip Doppler shift with the RL's time base. A cyclic set of 4096 complex capacitive integrators can be used to perform the process of signal accumulation to raise the weak signals up and out of the noise floor. The complex patterns (e.g., a pattern of length 2047 chips) have approximately 33 db of spreading gain. The addition of the cyclic integrators can achieve an additional 20 db of signal gain with the repetitive portions of the signal, yielding 53 db of total gain. A bandwidth reduction from 26 MHz down to about 100 Hz is achieved with this technique. The thermal noise over the 100 Hz bandwidth is approximately −154 dbm, where reasonable signal reception is expected around a noise level of −140 dbm. A maximum path loss of 150 dB is achieved for a +10 dbm transmitter. The corresponding ideal free space range for this transmitter is approximately 1000 km assuming a 915 MHz signal and omnidirectional antennae. This large free space range or loss margin is useful for building penetration, implanted devices, and so forth.

The capture duration in the MT is limited by the relative crystal frequency tolerance between the MT and the RL. With time and temperature, and taking advantage of periodic calibration signals, this tolerance can be managed to a few parts per million. Thus, the product of the signaling frequency and the crystal tolerance gives a frequency offset, which in turn indicates the maximum possible reception time without the use of multiple Doppler bins or repeated correlation attempts. For example at 915 MHz and with a 3.5 ppm frequency error, a capture period of 312 µs would correspond to a first complete signal null.

The RL will in general receive a signal whose cadence and frequency very closely match its internal crystal clock, and thus the RL can use long cyclic integration times, which greatly increase the available signal to noise ratio. The described coherent integration (or coherent accumulation) process has a signal power maximum when the signal has rotated through 180 degrees at the end of the capture interval. For a 3.5 ppm frequency tolerance, when the period of the spread signal is designed to be about 150 µs. It is advantageous to use a signal which is itself complex. Improved orthogonality between coded signals is achieved by using a complex signal. For example, the Gold codes used in the GPS system have a length of 1023 chips with a cross correlation of approximately −24 db for 1025 possible codes. The complex signaling codes employed in the presently described disclosure is on the order of length 2047 chips, with a cross-correlation of −33 db for 2048 possible codes. The use of complex codes allows for improved signal rejection.

The round trip Doppler shift between slowly moving objects (e.g., people walking) is on the order of 4-5 ppb. Slowly moving objects provide a significantly longer integration time in cases where the received signal is likely to be very close in frequency to the RL's time base. Even automobile speeds will result in a round-trip Doppler-shift of 200 ppb or less.

The described system performs distance measurement by round trip time measurement. The system also determines bearing between the RL and the MT by determining the associated Doppler-shift in the return signal. In one example, a Doppler shift is measured when the RL velocity is known (e.g., moving in a vehicle at a fixed rate). In another example, a differential Doppler shift is measured when the acceleration of the RL is known, allowing for target location even with moving targets using positional vector analysis. The RL's acceleration vector is readily measured with at least one of: a three-axis accelerometer, a GPS set with a clear view of the sky, or any other appropriate means. The position fixes may have a two-fold ambiguity in location, since for linear motion two angle estimates exist. The position fix is resolved in one example, by utilizing two antennas. Since the closer antenna will receive the return signal before the distant antenna, ambiguity for non-linear motion can be resolved by determining "which antenna is closer".

The presently described system, apparatus, and methods take advantage of the acquired frequency knowledge to allow for synthesis of a time and phase coherent response to accurately determine location with a low-power MT. Although the preceding description describes various embodiments of the system, the invention is not limited to such embodiments, but rather covers all modifications, alternatives, and equivalents that fall within the spirit and scope of the invention. Since many embodiments of the invention can be made without departing from the spirit and scope of the invention, the invention resides in the claims hereinafter appended.

What is claimed:

1. A method for locating a transponder (MT) with a remote locator (RL), the method comprising:

selecting an identification code (ID Code) for transmission from the RL to at least one MT, wherein each of the at least one MT has a specific associated ID Code;

generating a transmission signal for transmission by the RL, the transmission signal comprising: a first pattern that is repeated over a first transmission sequence, wherein the first transmission sequence contains a first portion of the selected ID code; and a second pattern that is cyclically shifted over a second transmission sequence such that a first one of the second pattern is cyclically shifted relative to a second one of the second pattern in the second transmission sequence, wherein the second transmission sequence contains a second portion of the selected ID code;

transmitting the transmission signal from the RL for reception by the MT at a first time;

receiving at least a portion of the transmission signal from the RL with the MT to provide a received signal;

correlating at least a first portion of the received signal with at least a first portion of a stored ID Code in the MT to detect the presence of the first portion of the selected ID Code in the first portion of the received signal;

upon detection of the first portion of the selected ID Code in the first portion of the received signal, further correlating at least a second portion of the received signal with at least a second portion of the stored ID Code in the MT to detect the presence of the second portion of the selected ID Code in the second portion of the received signal;

upon detection of the second portion of the selected ID Code in the second portion of the received signal, transmitting an acknowledgement signal from the MT to the RL;

receiving the acknowledgement signal from the MT with the RL at a second time; and determining a distance between the RL and the MT as a function of an elapsed time between the first time and the second time.

2. The method of claim 1, wherein the first portion of the selected ID code is the same as the second portion of the selected ID code.

3. The method of claim 1, wherein the second pattern that is cyclically shifted over the second transmission sequence such that the first one of the second pattern is cyclically shifted relative to the second one of the second pattern in the second transmission sequence according to a step size, wherein the step size comprises at least one of: an integer bit shift, a non-integer bit shift, a fractional bit shift, and a pattern timing change.

4. The method of claim 1, wherein the generating the transmission signal further comprises: combining the first transmission sequence and the second transmission sequence in the transmission signal such that the first transmission sequence and the second transmission sequence overlap one another.

5. The method of claim 1, wherein the generating the transmission signal further comprises: arranging the first transmission sequence and the second transmission sequence in the transmission signal such that one of the first transmission sequence and the second transmission sequence follows in succession to the other of the first transmission sequence and the second transmission sequence.

6. The method of claim 1, wherein transmitting the transmission signal from the RL to the MT comprises: transmitting the transmission signal during a first time period; and wherein receiving at least the portion of the transmission signal from the RL with the MT comprises: receiving the at least the portion of the transmission signal during a second time period that is substantially less than the first time period, and wherein the second time period overlaps with at least a portion of the first time period.

7. The method of claim 1, further comprising:

receiving at least a portion of the acknowledgement signal from the MT with the RL during a third time period; and wherein transmitting the acknowledgement signal from the MT to the RL comprises: transmitting the acknowledgement during the third time period with the MT.

8. The method of claim 1, wherein transmitting the transmission signal from the RL to the MT comprises: transmitting the transmission signal at a first power level during a first time period with the RL; and wherein transmitting the acknowledgement signal from the MT to the RL comprises transmitting the acknowledgement at a second power level during a third time period with the MT, wherein the first power level is at least an order of magnitude greater than the second power level.

9. The method of claim 1, further comprising: adjusting a synthesized frequency associated with the MT, wherein the synthesized frequency is adjusted according to at least one of a frequency, timing, phase, frequency offset, and cadence associated with the transmitter in the MT based upon the received signal, and wherein transmitting the acknowledgement signal from the MT to the RL comprises transmitting the acknowledgement signal with the synthesized frequency in the MT.

10. The method of claim 9, wherein the received signal is Doppler shifted relative to the transmitted signal from the RL such that the synthesized frequency corresponds to synthesized version of the Doppler shifted signal.

11. The method of claim 10, wherein the received acknowledgment signal is Doppler shifted relative to the transmitted acknowledgement signal from the MT such that the received acknowledgement signal corresponds to a synthetic round-trip Doppler shifted signal.

12. The method of claim 9, wherein the internal clocking mechanisms of both the RL and the MT each have a sufficient short-term stability to permit the MT to reply to the RL with an exactly synthesized frequency with negligible error.

13. The method of claim 1, wherein generating a transmission signal further comprises: generating a third pattern that is repeated over a third transmission sequence, wherein the third transmission sequence contains a third portion of the selected ID Code, and wherein the third transmission sequence is encoded with a message for the MT.

14. The method of claim 13, further comprising: partitioning the selected ID Code into at least one of: equally sized first, second, and third portions; differently sized first, second, and third portions; equally sized first and second portions where the third portion is different in size from the first and second portions; equally sized first and third portion where the second portion is different in size from the first and third portions, and equally sized second and third portion where the first portion is different in size from the second and third portions.

15. The method of claim 13, wherein encoding the third portion of the message for the MT comprises encoding the message in the third transmission frame with an error correction code.

16. The method of claim 13, wherein the message for the MT comprises a command and control message.

17. The method of claim 13, further comprising: transmitting the first transmission sequence, the second transmission sequence, and the third transmission sequence in succession to one another.

18. The method of claim 1, wherein transmitting the transmission signal from the RL comprises modulating the transmission signal for at least one of: a multi-phase shift keying (MPSK) pattern, a binary-phase shift keying (BPSK) pattern, a quadrature phase shift keying (QPSK) pattern, a differential phase shift keyed (DPSK) pattern, a continuous phase modulation (CPM) pattern, and a multiple amplitude and phase shift keying (MAPSK) pattern.

19. The method of claim 1, wherein transmitting the transmission signal comprises transmitting the transmission signal with a transmitter in the RL, and wherein receiving at least the portion of the transmission signal comprises receiving the at least the portion of the transmission signal with a receiver in the RL, and wherein the transmitter in the RL and the receiver in the MT are phase and frequency coherent with one another.

20. The method of claim 1, wherein transmitting the acknowledgement signal comprises transmitting the acknowledgement signal with a transmitter in the MT, and wherein receiving the acknowledgement signal comprises receiving the acknowledgement signal with a receiver in the RL, and wherein the transmitter in the MT and the receiver in the RL are phase and frequency coherent with one another.

21. The method of claim 1, wherein receiving the acknowledgement signal from the MT with the RL further comprises: capturing at least portion of the acknowledgment signal with the RL, and coherently accumulating the captured portion to provide an accumulated captured portion such that the signal-to-noise ratio associated with the captured acknowledgement signal is increased.

22. The method of claim 21, wherein the coherent accumulation is provided by at least one of: a digital accumulator and an analog accumulator.

23. The method of claim 1, wherein transmitting the transmission signal from the RL for reception by the MT comprises: operating a transmitter in the RL with a frequency reference to provide a transmitted signal;
wherein receiving at least a portion of the transmission signal from the RL with the MT comprises: operating a receiver in the MT to capture at least a portion of the transmission signal, wherein the operating frequency and sampling clock associated with the receiver are phase locked to the frequency reference used in the transmitted signal; and
wherein transmitting an acknowledgement signal from the MT to the RL comprises: operating a transmitter in the MT such that the receiver in the MT is frequency and phase coherent with the transmitter in the MT.

24. The method of claim 23, further comprising:
retrieving a second identification code (second ID Code) for transmission from the MT to the RL, wherein the second ID Code is associated with the MT; and
generating the acknowledgement signal for transmission by the MT, the acknowledgement signal comprising: a fourth pattern that is repeated over a fourth sequence, wherein the fourth sequence contains a first portion of the second ID code; and a fifth pattern that is cyclically shifted over a fifth sequence such that a first instance of the fifth pattern is cyclically shifted relative to a second instance of the fifth pattern in the fifth sequence, wherein the fifth sequence contains a second portion of the second ID code.

25. The method of claim 24, wherein the second ID is at least one of: matched to the ID code, and different from the ID Code.

26. The method of claim 24, wherein the fourth pattern is at least one of:
matched to the first pattern, and different from the first pattern.

27. The method of claim 24, wherein the fifth pattern is at least one of: matched to the second pattern, and different from the second pattern.

28. The method of claim 23, further comprising:
capturing portions of the acknowledgement signal with the RL;
correlating the capture portions of the acknowledgement signal with the RL,
summing the correlations associated with captured portions of the acknowledgement signal in the RL to provide an accumulated correlation, and
identifying a correlation match in the RL when the accumulated correlation indicates that the acknowledgement transmission is matched to at least a portion of the second ID Code that is associated with the MT.

29. The method of claim 23, further comprising:
capturing portions of the acknowledgement signal with the RL;
summing the captured portions of the acknowledgement signal to provide an accumulated signal; and
correlating the accumulated signal to provide an accumulated correlation, and
identifying a correlation match in the RL when the accumulated correlation indicates that the acknowledgement transmission is matched to at least a portion of the second ID Code that is associated with the MT.

30. The method of claim 29, further comprising: cyclically selecting a different capture buffer in the RL for each subsequent captured portion of the acknowledgement signal when the captured portion of the acknowledgement signal corresponds to the fifth pattern, and coherently accumulating each cyclically rotated captured portion with the cyclically selected capture buffers to provide a coherently accumulated received pattern such that signal-to-noise ratio associated with reception in the RL is increased.

31. The method of claim 23, further comprising: determining at least one of fine timing, phase, starting time, and cadence of the transmission associated with the MT by evaluating at least one correlation associated with the stored captured portions of the acknowledgement signal.

32. The method of claim 1, further comprising:
receiving a first portion of the transmission signal that is associated with the first transmission sequence at a first time in the MT;
correlating the received first portion of the transmission signal with the first portion of the ID Code in the MT;
receiving a second portion of the transmission signal at a second time with the MT; and
identifying a fine timing and a phase associated with a frame timing of the transmission signal from the RL when the received portions of the transmission signal in the MT correlate with the first portion of the ID Code.

33. The method of claim 32, further comprising: refining frequency and timing estimates associated with the first frame timing with a subsequently received portion of the transmission signal that is associated with the first transmission sequence.

34. The method of claim 32, wherein identifying the fine timing and phase associated with the frame timing comprises: estimating a frequency associated with the transmission signal from the RL, measuring a first phase associated with the received first portion of the transmission signal, measuring a second phase associated with the received second portion of the transmission signal, determining a difference between the first phase and the second phase, identifying a frequency offset associated with the frequency from the difference between the first phase and the second phase.

35. The method of claim 34, further comprising: estimating a phase associated with the second portion of the transmission signal, and scheduling the reception of the first and second portions of the transmission signal at the first and second times such that a magnitude associated with a difference between the estimated phase and the second phase is in a range from 0 to 90 degrees.

36. The method of claim 32, further comprising:
receiving a third portion of the transmission signal at a third time in the MT, wherein the third portion of the transmission signal is associated with the first transmission sequence;
correlating the third portion of the transmission signal with the first portion of the ID Code in the MT; and
refining at least one of the frequency, frequency offset, timing, and phase estimates associated with the first frame timing with information determined from the received third portion of the transmission signal in the MT.

37. The method of claim 1, further comprising:
receiving a fourth portion of the transmission signal at a fourth time in the MT, wherein the fourth portion of the transmission signal is associated with the second transmission sequence;

correlating the received fourth portion of the transmission signal with the second portion of the ID Code in the MT; and identifying a position within the second frame when the received fourth portion of the transmission signal correlates with the second portion of the ID Code in the MT.

38. The method of claim 37, further comprising: completing a coarse timing acquisition base on the recovered correlated peak associated with the received portion of the transmission signal with the MT.

39. The method of claim 1, further comprising:
correlating the received signal with a third portion of the ID Code, wherein generating the transmission signal for transmission by the RL further comprises generating a third pattern that is repeated over a third transmission sequence, wherein the third transmission sequence contains the third portion of the selected ID code, and wherein a message is encoded in the third transmission sequence; and extracting at least a portion of the message from the received signal when the received signal correlates with the third portion of the ID code in the MT.

40. The method of claim 1, further comprising: sensing a direction of travel associated with the RL relative to the MT, determining a location of the MT relative to the RL with at least the sensed direction of travel and the determined distance.

41. The method of claim 40, wherein determining the location of the MT further comprises at least one of: evaluating a Doppler shift, evaluating a Double Doppler shift, evaluating a synthetic round-trip Doppler shift, evaluating an acceleration vector, evaluating a velocity vector, evaluating a direction vector, and evaluating successive distance measurements.

42. The method of claim 40, further comprising:
identifying a first portion of the acknowledgement signal with the RL, wherein the first portion of the acknowledgement signal is associated with a first antenna when the RL is traveling in a first direction;

identifying a second portion of the acknowledgement signal with the RL, wherein the second portion of the acknowledgement signal is associated with the first antenna when the RL is traveling in a second direction that is different from the first direction; and wherein determining a location of the MT further comprises:
evaluating arrival times for the receipt of the first portion and the second portion of the acknowledgement signal; and resolving a direction of travel ambiguity relative to the RL and the MT based on the evaluation of the arrival times.

43. The method of claim 40,
wherein identifying arrival times further comprises:
identifying a first portion of the acknowledgement signal with the RL, wherein the first portion of the acknowledgement signal is associated with a first antenna;

identifying a second portion of the acknowledgement signal with the RL, wherein the second portion of the acknowledgement signal is associated with the second antenna, and wherein the first antenna and the second antenna are located apart from one another in the RL; and wherein determining a location of the MT further comprises:
evaluating the arrival times for the receipt of the first portion and the second portion of the acknowledgement signal; and resolving a direction of travel ambiguity relative to the RL and the MT based on the evaluation of the arrival times.

44. The method of claim I, further comprising:
identifying a first portion of the acknowledgement signal with the RL, wherein the first portion of the acknowledgement signal is associated with a first antenna;

identifying a second portion of the acknowledgement signal with the RL, wherein the second portion of the acknowledgement signal is associated with a second antenna;

identifying a third portion of the acknowledgement signal with the RL, wherein the third portion of the acknowledgement signal is associated with a third antenna, and wherein the first antenna, the second antenna, and the third antenna are each located apart from one another;

evaluating the arrival times for the receipt of the first, second, and third portions of the acknowledgement signals; and resolving a direction of travel ambiguity relative to the RL and the MT based on the evaluation of the arrival times.

45. A method for adjusting an internal timing and frequency in a transponder (MT) by receiving a transmission from a remote locator (RL), the method comprising:
capturing a first portion of a first transmission sequence from the transmission during a first capture interval;

correlating the captured first portion with a first portion of an identification code (ID Code) that is associated with the MT;

identifying a first received time associated with the correlated captured first portion;

extracting initial timing and phase from the correlated captured first portion;

scheduling a second capture interval with an expected phase;

capturing a second portion of the first transmission sequence from the transmission during the second capture interval;

correlating the captured second portion with the first portion of the ID Code that is associated with the MT;

identifying a second receive time associated with the correlated captured second portion;

extracting a second timing and phase from the correlated captured second portion;

determining a phase difference between the expected phase and the extracted second phase, and a time different between the first capture interval and the second capture interval; and adjusting a fine timing and phase associated with the receiver when the captured portions correlate, with the determined phase difference and the determined time difference.

46. The method of claim 45, wherein the determined phase difference is in a range from 0 to 90 degrees.

47. The method of claim 45, further comprising synthesizing a frequency for the MT by synthesizing an in-phase clock signal and synthesizing a quadrature phase clock signal with a reference clock signal.

48. The method of claim 45, further comprising:
capturing a third portion of a second transmission sequence from the transmission during a third capture interval;

circularly correlating the captured third portion with a second portion of the ID Code that is associated with the MT;

identifying a position in a transmission frame when the captured third portion correlates with the second portion of the ID code; and adjusting a coarse timing associated with the transmission frame from the identified position.

49. The method of claim 48, further comprising:
scheduling a capture time interval for a third transmission sequence based upon:
the identified position associated with the second transmission sequence, and the adjusted fine timing and phase associated with the receiver timing from the first transmission sequence;
capturing a portion of a third transmission sequence from the transmission at the scheduled capture time interval;
correlating the captured portion of the third transmission sequence with a third portion of the selected ID Code; and
extracting at least a portion of an encoded message from the captured portion of the third transmission sequence when the captured portion of the third transmission sequence correlates with the third portion of the selected ID Code.

50. The method of claim 49, further comprising: partitioning the selected ID Code into at least one of: equally sized first, second, and third portions; differently sized first, second, and third portions; equally sized first and second portions where the third portion is different in size from the first and second portions; equally sized first and third portion where the second portion is different in size from the first and third portions, and equally sized second and third portion where the first portion is different in size from the second and third portions.

51. The method of claim 49, further comprising: evaluating the third transmission sequence to improve the reliability of the message with an error correcting code.

52. The method of claim 49, wherein extracting the encoded message comprises: decoding a modulated message in the third transmission frame, wherein the modulated message was encoded with at least one of: a multi-phase shift keying (MPSK) pattern, a binary-phase shift keying (BPSK) pattern, a quadrature phase shift keying (QPSK) pattern, a differential phase shift keyed (DPSK) pattern, a continuous phase modulation (CPM) pattern, and a multiple amplitude and phase shift keying (MAPSK) pattern.

53. The method of claim 49, further comprising: identifying a command and control message from the extracted message.

54. The method of claim 48, further comprising: transmitting an acknowledgement signal to the RL using at least one of the frequency, timing, phase, position, and cadence information determined from the received portions of the transmission associated with the first transmission sequence and the second transmission sequence.

55. The method of claim 45, further comprising: activating a sleep mode in the MT when the first portion of the first transmission sequence fails to correlate to the first portion of the selected ID Code.

56. A system for locating a transponder with a remote locator, the system comprising:
a remote locator (RL) comprising:
means for selecting an identification code (ID Code) for transmission from the RL, wherein the selected ID Code is associated with the MT;
means for generating a first transmission sequence with a first pattern, wherein the first transmission sequence is arranged for transmission in a first frame such that the first pattern is repeated in the first transmission sequence over the first frame;
means for generating a second transmission sequence with a second pattern, wherein the second transmission sequence is arranged for transmission in a second frame such that each subsequent pattern in the second transmission sequence is cyclically shifted relative to the preceding pattern over the second frame;
means for generating a third transmission sequence with a third pattern, wherein the third transmission sequence is arranged for transmission in a third frame;
means for encoding a first portion of the selected ID Code into the first transmission sequence;
means for encoding a second portion of the selected ID Code into the second transmission sequence;
means for encoding a third portion of the selected ID Code and a message for the MT into the third transmission sequence;
means for transmitting the first, second, and third transmission frames;
means for receiving an acknowledgement signal from an MI; and
means for determining a distance between the RL and the MT as a function of an elapsed time between the transmission of the first, second, and third transmission frames and the receipt of the acknowledgement signal from the MT; and
a transponder (MT) comprising:
means for capturing at least a first portion and a second portion of the first transmission sequence;
means for correlating the captured first and second portions of the first transmission sequence with the first portion of the ID Code;
means for adjusting a fine timing, phase, and frequency associated with the MT frequency when the captured first and second portions of the first transmission sequence is correlated to the first portion of the ID Code;
means for capturing a portion of the second transmission sequence;
means for correlating the captured portion of the second transmission sequence with a second portion of the ID Code;
means for identifying a position with the second transmission frame when the captured portion of the second transmission sequence is correlated to the second portion of the ID Code;
means for scheduling a capture time interval for receiving the third transmission sequence based upon: the identified position associated with the second transmission frame, and the adjusted frequency, fine timing, and phase associated with the receiver timing from the first transmission frame;
means for capturing the third transmission sequence at the scheduled capture time interval;
means for correlating the captured third transmission sequence with the third portion of the ID Code;
means for extracting the encoded message from the third transmission sequence when the captured third transmission sequence is correlated to the third portion of the selected ID Code; and
means for transmitting an acknowledgement signal to the RL from the MT.

57. The system of claim 56, wherein the MT transmitted acknowledgement signal is arranged to match a corresponding Doppler shifted RL signal.

58. A remote locator (RL) that is arranged to locate a transponder (MT), the RL comprising:
a means for selecting an identification code (ID Code) that is associated with the MT;

a means for generating sequences, wherein the means for generating sequences is arranged provide:
 a first transmission sequence with a first pattern, wherein the first transmission sequence is arranged for transmission in a first frame such that the first pattern is repeated in the first transmission sequence over the first frame; and
 a second transmission sequence with a second pattern, wherein the second transmission sequence is arranged for transmission in a second frame such that each subsequent second pattern in the second transmission sequence is cyclically processed relative to the preceding second pattern over the second frame;
a means for encoding, wherein the means for encoding is arranged to encode:
 a first portion of the selected ID Code into the first transmission sequence; and
 a second portion of the selected ID Code into the second transmission sequence.

59. The RL of claim 58, further comprising: a means for transmitting the first and second transmission frames in succession to one another.

60. The RL of claim 58, wherein the second transmission sequence is cyclically processed such that a first pattern in the second transmission sequence is related to a second pattern in the second transmission sequence according to at least one of: an integer bit shift, a non-integer bit shift, a fractional bit shift, and a pattern timing change, and a carrier phase change.

61. The RL of claim 58, wherein the means for generating sequences is further arranged to provide a third transmission sequence with a third pattern, wherein the third transmission sequence is arranged for transmission in a third frame; and wherein the means for encoding is further arranged to encode a third portion of the selected ID Code and a message for the MT into the third transmission sequence.

62. The RL of claim 58, further comprising: a means for receiving a reply transmission from the MT, and a means for evaluating a round-trip time associated with the transmissions and receptions between the apparatus and the MT.

63. The RL of claim 62, further comprising: a means for resolving a direction of travel ambiguity relative to the RL and the MT based on the evaluation of the arrival times.

64. The RL of claim 58, further comprising an output means, wherein the output means comprises at least one of: an electronic compass display, a graphic display, a compass row-type display, a photo-ID display, a graphical indicator superimposed on the display indicating a location on a map, a vector-type display, a raster-type display, a LCD-type display, a discrete LED display, a distance indicator, a compass indicator, a directional indicator, an audio indicator, and a synthesized voice indicator.

65. The RL of claim 58, further comprising an input means, wherein the input means comprises at least one of: an electronic keypad, a touch-panel, a mouse, a joystick, a keyboard, a voice recognition mechanism, and a microphone.

66. A transponder (MT) that is arranged to receive transmission from a remote locator (RL), the MT comprising:
 a means for synthesizing a receiver frequency;
 a means for associating an ID Code with the apparatus;
 a means for capturing transmissions;
 a means for scheduling that is arranged in cooperation with the means for capturing transmissions to selectively capture at least a portion of at least one of a first transmission frame and at least a portion of a second transmission frame;
 a means for correlating captured transmissions with the ID Code;
 a means for evaluating the correlation of the captured transmissions;
 a means for adjusting a fine timing and a phase associated with the receiver frequency when the selective evaluation of the correlation of the captured transmission yields a match with a first portion of the Code; and
 a means for identifying a position with the second transmission frame when the selective evaluation of the correlation of the captured transmission yields a match with a second portion of the ID Code.

67. The MT of claim 66, further comprising: a means for authenticating captured transmissions when the captured transmissions correlated to the ID Code.

68. The MT of claim 66, further comprising: a means for capturing at least a portion of a third transmission frame, and a means for extracting information from captured portions of the third transmission frame when the captured portion of the third transmission frame correlate to a third portion of the ID Code.

69. The MT of claim 68, wherein the information extracted from the captured portions for the third transmission comprise at least one of: an encoded message, an error correction coded message, a command message, and a control message.

70. The MT of claim 66, further comprising: a means for transmitting a reply message, wherein the reply message is transmitted using the timing, phase, cadence, and frequency that is determined from: the adjusted fine timing and phase, and identified position from the second transmission frame.

71. The MT of claim 66, further comprising: a means for logging at least one of physiological information and sensory information associated with a user of the MT.

72. The MT of claim 71, further comprising a means for encoding the logged information into a reply transmission for the RL.

73. The MT of claim 71, wherein the logged information comprises at least one of: a physiological condition associated with the user, a blood pressure associated with the user, a body temperature associated with the user, a heart rate associated with the user, a blood-sugar level associated with the user, and a heart rhythm associated with the user.

74. A transponder (MT) that is arranged to communicate with a remote locator (RL), the RL adapted to provide a signal transmission that is coded with a transmit identification code (transmit ID Code) that is associated with the MT, the MT comprising:
 a means for synthesizing a transmit frequency for the MT;
 a means for receiving at least a portion of the transmission from the RL;
 a means for correlating received portions of the transmission;
 a means for extracting first timing and first phase information from a first captured portion of the transmission that correlates with the transmit ID Code;
 a means for extracting second timing and second phase information from a second captured portion of the transmission that correlates with the transmit ID Code;
 a means for determining a frequency offset for the transmit frequency from the first timing information, first phase information, second timing information, and second phase information;
 a means for adjusting at least one of the frequency, timing, phase, and cadence associated with the transmit frequency in response to the determined frequency offset; and a means for transmitting an acknowledgement signal to the RL using the adjusted frequency, timing, phase, and cadence that is recovered from the received signals from the RL.

75. The MT of claim 74, further comprising a sensing means for providing sensory information, wherein the sensing means comprises at least one of: a physiological condition sensor, a blood pressure sensor, a body temperature sensor, a heart rate sensor, a blood-sugar level sensor, and a heart rhythm sensor.

76. The MT of claim 75, the means for transmitting the acknowledgement signal further comprising: a means for encoding the sensory information in a reply message, and a means for encoding the reply message with a reply ID Code.

77. The MT of claim 76, wherein the reply ID Code corresponds to at least one of: the transmit ID Code, and another ID Code that is different from the transmit ID Code.

* * * * *